United States Patent
Tachiki et al.

(10) Patent No.: US 10,851,467 B2
(45) Date of Patent: Dec. 1, 2020

(54) STEEL SHEET FOR CONTAINERS, AND METHOD FOR PRODUCING STEEL SHEET FOR CONTAINERS

(71) Applicant: NIPPON STEEL & SUMITOMO METAL CORPORATION, Tokyo (JP)

(72) Inventors: Akira Tachiki, Kitakyushu (JP); Shigeru Hirano, Kitakyushu (JP); Yoshiaki Tani, Kitakyushu (JP); Hirokazu Yokoya, Onga-gun (JP); Morio Yanagihara, Wuhan (CN)

(73) Assignee: NIPPON STEEL CORPORATION, Tokyo (JP)

(*) Notice: Subject to any disclaimer, the term of this patent is extended or adjusted under 35 U.S.C. 154(b) by 99 days.

(21) Appl. No.: 15/739,052

(22) PCT Filed: Jun. 23, 2015

(86) PCT No.: PCT/JP2015/067963
§ 371 (c)(1),
(2) Date: Dec. 21, 2017

(87) PCT Pub. No.: WO2016/207966
PCT Pub. Date: Dec. 29, 2016

(65) Prior Publication Data
US 2018/0187324 A1 Jul. 5, 2018

(51) Int. Cl.
*C25D 9/08* (2006.01)
*C25D 3/30* (2006.01)
(Continued)

(52) U.S. Cl.
CPC ............ *C25D 9/08* (2013.01); *B32B 15/01* (2013.01); *B32B 15/013* (2013.01); *B32B 15/04* (2013.01);
(Continued)

(58) Field of Classification Search
CPC ... C25D 3/30; C25D 3/54; C25D 3/12; C25D 9/08; C25D 5/12; C25D 5/10; C25D 5/48;
(Continued)

(56) References Cited

U.S. PATENT DOCUMENTS 6,379,521 B1 4/2002 Nishio
2013/0034745 A1 2/2013 Tachiki et al.
(Continued)

FOREIGN PATENT DOCUMENTS

CN 101076615 A 11/2007
CN 101410553 A 4/2009
(Continued)

OTHER PUBLICATIONS

Chinese Office Action and Search Report, dated Oct. 9, 2018, for corresponding Chinese Application No. 201580081125.4, with an English translation of the Search Report.
(Continued)

*Primary Examiner* — Michael E. La Villa
(74) *Attorney, Agent, or Firm* — Birch, Stewart, Kolasch & Birch, LLP

(57) ABSTRACT

A steel sheet for containers including a steel sheet, a Sn coated layer that is formed on at least one surface of the steel sheet, and a chemical treatment layer that is formed on the Sn coated layer. A variation amount in a yellowness index measured at one measurement point on the outermost surface of the chemical treatment layer is defined as $\Delta YI$, and represented by $\Delta YI = YI - YI_0$, wherein YI is the yellowness index measured after the steel sheet for containers is subjected to a retort treatment at a temperature of 130° C. for 5 hours, and $YI_0$ is the yellowness index measured before the retort treatment. An average of absolute values of the $\Delta YI$ obtained at a plurality of measurement points included in a unit area of the outermost surface is 5.0 or less.

17 Claims, 2 Drawing Sheets

(51) Int. Cl.
| | |
|---|---|
| C25D 3/12 | (2006.01) |
| C22C 1/00 | (2006.01) |
| C25D 5/10 | (2006.01) |
| C25D 5/48 | (2006.01) |
| C21D 8/02 | (2006.01) |
| C25D 3/54 | (2006.01) |
| C23C 2/04 | (2006.01) |
| B32B 15/04 | (2006.01) |
| C23C 28/00 | (2006.01) |
| C23C 30/00 | (2006.01) |
| C23C 2/08 | (2006.01) |
| C23C 22/03 | (2006.01) |
| C22C 1/02 | (2006.01) |
| B32B 15/01 | (2006.01) |
| B32B 15/18 | (2006.01) |
| C22C 1/04 | (2006.01) |
| C23C 22/07 | (2006.01) |
| C23C 2/02 | (2006.01) |
| C25D 5/12 | (2006.01) |
| C21D 8/00 | (2006.01) |
| C25D 5/50 | (2006.01) |
| C21D 9/46 | (2006.01) |
| C23F 17/00 | (2006.01) |

(52) U.S. Cl.
CPC .......... *B32B 15/043* (2013.01); *B32B 15/18* (2013.01); *C21D 8/0278* (2013.01); *C21D 8/0284* (2013.01); *C22C 1/023* (2013.01); *C22C 1/0483* (2013.01); *C23C 2/02* (2013.01); *C23C 2/04* (2013.01); *C23C 2/08* (2013.01); *C23C 22/03* (2013.01); *C23C 22/07* (2013.01); *C23C 28/30* (2013.01); *C23C 28/32* (2013.01); *C23C 28/321* (2013.01); *C23C 28/322* (2013.01); *C23C 28/34* (2013.01); *C23C 28/345* (2013.01); *C23C 30/00* (2013.01); *C23C 30/005* (2013.01); *C25D 3/30* (2013.01); *C25D 3/54* (2013.01); *C25D 5/10* (2013.01); *C25D 5/12* (2013.01); *C25D 5/48* (2013.01); *C21D 8/00* (2013.01); *C21D 8/0205* (2013.01); *C21D 8/0236* (2013.01); *C21D 9/46* (2013.01); *C22C 1/02* (2013.01); *C23F 17/00* (2013.01); *C25D 3/12* (2013.01); *C25D 5/505* (2013.01); *Y10T 428/1266* (2015.01); *Y10T 428/12611* (2015.01); *Y10T 428/12618* (2015.01); *Y10T 428/12708* (2015.01); *Y10T 428/12722* (2015.01); *Y10T 428/12806* (2015.01); *Y10T 428/12937* (2015.01); *Y10T 428/12944* (2015.01); *Y10T 428/12951* (2015.01); *Y10T 428/12958* (2015.01); *Y10T 428/12965* (2015.01); *Y10T 428/12972* (2015.01); *Y10T 428/12979* (2015.01); *Y10T 428/12993* (2015.01); *Y10T 428/2495* (2015.01); *Y10T 428/24967* (2015.01); *Y10T 428/26* (2015.01); *Y10T 428/263* (2015.01); *Y10T 428/264* (2015.01); *Y10T 428/265* (2015.01); *Y10T 428/27* (2015.01)

(58) Field of Classification Search
CPC .......... C25D 5/505; C23F 17/00; C22C 1/02; C22C 1/023; C22C 1/0483; C21D 9/46; C21D 8/0236; C21D 8/0205; C21D 8/0278; C21D 8/0284; C21D 8/00; C23C 30/00; C23C 30/005; C23C 2/02; C23C 2/04; C23C 2/08; C23C 22/03; C23C 22/07; C23C 28/32; C23C 28/321; C23C 28/34; C23C 28/345; C23C 28/30; C23C 28/322; B32B 15/01; B32B 15/013; B32B 15/04; B32B 15/043; B32B 15/18; Y10T 428/12611; Y10T 428/12618; Y10T 428/1266; Y10T 428/12708; Y10T 428/12722; Y10T 428/12944; Y10T 428/12806; Y10T 428/12937; Y10T 428/12958; Y10T 428/12951; Y10T 428/12965; Y10T 428/12972; Y10T 428/12979; Y10T 428/12993; Y10T 428/2495; Y10T 428/24967; Y10T 428/26; Y10T 428/27; Y10T 428/263; Y10T 428/264; Y10T 428/265

See application file for complete search history.

(56) References Cited

U.S. PATENT DOCUMENTS

| | | | |
|---|---|---|---|
| 2013/0206285 A1 | 8/2013 | Suzuki et al. | |
| 2013/0209829 A1 | 8/2013 | Suzuki et al. | |
| 2013/0209830 A1* | 8/2013 | Suzuki | B32B 1/08 428/626 |
| 2016/0122891 A1 | 5/2016 | Tani et al. | |
| 2017/0159185 A1* | 6/2017 | Tani | B32B 15/01 |
| 2017/0342585 A1* | 11/2017 | Goto | C25D 3/30 |

FOREIGN PATENT DOCUMENTS

| | | |
|---|---|---|
| CN | 102308026 A | 1/2012 |
| EP | 2 439 310 A1 | 4/2012 |
| EP | 2 589 685 A1 | 5/2013 |
| JP | 54-068734 A | 6/1979 |
| JP | 61-243192 A | 10/1986 |
| JP | 11-264093 A | 9/1999 |
| JP | 2000-239855 A | 9/2000 |
| JP | 2005-023422 A | 1/2005 |
| JP | 2005-325402 A | 11/2005 |
| JP | 2006-009047 A | 1/2006 |
| JP | 2008-050641 A | 3/2008 |
| JP | 2009-001851 A | 1/2009 |
| JP | 2009-1854 A | 1/2009 |
| JP | 2009-084623 A | 4/2009 |
| JP | 2009-120919 A | 4/2009 |
| JP | 2010-053424 A | 3/2010 |
| JP | 2011-012344 A | 1/2011 |
| JP | 4886811 B2 | 2/2012 |
| JP | 2012-062518 A | 3/2012 |
| JP | 2012-062519 A | 3/2012 |
| JP | 2012-062520 A | 3/2012 |
| JP | 4920800 B2 | 4/2012 |
| TW | 201229312 A1 | 7/2012 |
| WO | WO 2011/118588 A1 | 9/2011 |
| WO | WO 2012/002360 A1 | 1/2012 |
| WO | WO 2014/189081 A1 | 11/2014 |
| WO | WO 2016/056621 A1 | 4/2016 |
| WO | WO 2016/167357 A1 | 10/2016 |

OTHER PUBLICATIONS

Notice of Reasons for Rejection dated Mar. 5, 2019, issued in Japanese Application No. 2017-524306.
Extended European Search Report issued in corresponding European Patent Application No. 15896288.6 dated Jan. 14, 2019.
International Search Report for PCT/JP2015/067963 (PCT/ISA/210) dated Sep. 15, 2015.
Office Action dated Mar. 21, 2016 of Taiwanese Patent Application No. 104120160.
Written Opinion of the International Searching Authority for PCT/JP2015/067963 (PCT/ISA/237) dated Sep. 15, 2015.

* cited by examiner

STEEL SHEET FOR CONTAINERS, AND METHOD FOR PRODUCING STEEL SHEET FOR CONTAINERS

TECHNICAL FIELD OF THE INVENTION

The present invention relates to a steel sheet for containers and a method for producing a steel sheet for containers.

RELATED ART

As containers for beverages and foods, metal containers that can be obtained by making cans using a steel sheet such as a Ni coated steel sheet, a Sn coated steel sheet, or a Sn-based alloy coated steel sheet (steel sheet for containers) are frequently used. When such a metal container is used as a container for beverages and a container for foods, it is necessary to perform coating on the surface of the metal container before can making or after can making.

However, in recent years, from the viewpoint of protecting the global environment, in order to reduce waste resulting from lacquers such as a waste solvent and exhaust gas such as carbon dioxide gas, the technique of attaching a film to a metal container instead of coating has become popular.

In order to secure the corrosion resistance and lacquer adhesion or film adhesion, a steel sheet which is subjected to an anticorrosion treatment (chromate treatment) by chromating using hexavalent chromate or the like is used as a base material for lacquer or a film (for example, refer to Patent Document 1). In the steel sheet which is subjected to the chromate treatment, as necessary, a coating layer formed of an organic resin is formed on the film layer (chromate film layer) formed by the chromate treatment to improve organic solvent resistance, fingerprint resistance, scratch resistance, lubricity, and the like.

However, in recent years, since hexavalent chromium used for a chromate treatment is harmful to the environment, there has been a tendency not to use the hexavalent chromium. On the other hand, since the chromate film has excellent corrosion resistance and lacquer adhesion or film adhesion with respect to the steel sheets, in the case of not performing such a chromate treatment, the corrosion resistance and lacquer adhesion or film adhesion may be significantly deteriorated.

Therefore, there has been a demand for performing an anticorrosion treatment on the surface of a steel sheet for containers instead of a chromate to form an anticorrosive layer having excellent corrosion resistance and lacquer adhesion or film adhesion. As the anticorrosion treatments that have been proposed to replace the chromate treatment, the following methods have been proposed.

For example, Patent Documents 2 and 3 each disclose a method for performing a cathode electrolytic treatment using a chemical treatment liquid that contains a compound containing Zr and a compound containing F on a Sn coated steel sheet or a Sn coated steel sheet containing a Sn alloy.

Patent Document 4 discloses a method for performing an electrolytic treatment or another chemical treatment on a Sn coated steel sheet using a chemical treatment liquid that contains at least any one of the group consisting of a phosphate ion, a Ti ion, and a Zr ion.

Patent Document 5 discloses a metal material having an inorganic treatment layer that contains a Zr ion and F and does not contain a phosphate ion, and an organic treatment layer, and a treatment method thereof.

Patent Document 6 discloses a method for performing an electrolytic treatment or an immersion treatment on a Ni coated steel sheet using a chemical treatment liquid that contains a Zr ion and organic substance.

Patent Documents 7 to 10 each disclose a method for performing an electrolytic treatment on a steel sheet using a solution that contains a Zr ion, a phosphate ion, and a nitrate ion.

Particularly, Patent Document 8 discloses a method for promoting formation of a Zr film by adding more of nitrate ions.

PRIOR ART DOCUMENT

Patent Document

[Patent Document 1] Japanese Unexamined Patent Application, First Publication No. 2000-239855
[Patent Document 2] Japanese Unexamined Patent Application, First Publication No. 2005-325402
[Patent Document 3] Japanese Unexamined Patent Application, First Publication No. 2005-23422
[Patent Document 4] Japanese Unexamined Patent Application, First Publication No. S54-68734
[Patent Document 5] Japanese Unexamined Patent Application. First Publication No. 2006-9047
[Patent Document 6] Japanese Unexamined Patent Application, First Publication No. 2008-50641
[Patent Document 7] Japanese Unexamined Patent Application, First Publication No. 2009-84623
[Patent Document 8] PCT International Publication No. WO2011/118588
[Patent Document 9] Japanese Patent No. 4920800
[Patent Document 10] Japanese Patent No. 4886811

DISCLOSURE OF THE INVENTION

Problems to be Solved by the Invention

As described above, Patent Documents 2 to 10 disclose the techniques of forming a film containing a Zr compound on a steel sheet by performing an electrolytic treatment on the steel sheet in a solution containing a Zr ion and a F ion. However, in these techniques, an adhesion of film such as polyester to a surface of a metal container cannot be sufficiently secured in some cases.

By using an adhesive, a primer, or the like between the film and the film formed on the steel sheet (metal container), the film adhesion can be improved. However, the use of an adhesive, a primer, or the like increases the number of production processes such as a step of applying an adhesive, a primer, or the like and a baking step to secure the adhesion. Such a method is not always economical.

In the case of forming a film by a continuous electrolytic treatment, in the chemical treatment liquid containing an organic substance such as a phenol resin, the organic substance is decomposed on an anode or the phenol resin is inevitably insolubilized by interaction with a metal ion in some cases. Therefore, it is difficult to appropriately maintain the concentration of the phenol resin contained in the chemical treatment liquid in some cases.

For the above reasons, a film containing a phenol resin cannot be stably formed in some cases and thus it is desirable that a phenol resin is not contained.

It is necessary for a steel sheet for containers used as a container for foods to have sulfide stain resistance. In Patent Documents 2 to 8, the sulfide stain resistance is not disclosed.

In the case where the steel sheet for containers is used as a container for foods containing, for example, high protein foods such as fish, meat, and beans as a content, at least one of the inner surface of the container or the content may be discolored into black in some cases by a retort treatment (high-temperature sterilization treatment in the presence of steam) after the container is filled with foods. Sulfide stain refers to a blackening phenomenon.

Sulfur contained in the food is thermally decomposed by the retort treatment to produce hydrogen sulfide ($H_2S$), thiols ($HS^-$), and the like. The hydrogen sulfide and the thiols react with the constitution metal of the inner surface of the container and thus produce a black metal sulfide. Therefore, the sulfide stain occurs.

Due to the sulfide stain, the external appearance of the container becomes poor. Further, a consumer misunderstands that the produced black metal sulfide is corrosion of the metal of the inner surface of the container or corrosion of the content. Therefore, it is necessary to prevent the sulfide stain from occurring as much as possible.

It is required for the steel sheet for containers to have weldability, lacquer adhesion, and corrosion resistance, as well as sulfide stain resistance and film adhesion.

The present invention is made in consideration of the above circumstances, and an object thereof is to provide a steel sheet for containers having excellent film adhesion, sulfide stain resistance, weldability, lacquer adhesion, and corrosion resistance and a method for producing a steel sheet for containers.

Means for Solving the Problem

In order to achieve the object by solving the above problem, the present invention employs the following means.

(1) According to an aspect of the present invention, there is provided a steel sheet for containers including: a steel sheet; a Sn coated layer that is formed on at least one surface of the steel sheet; and a chemical treatment layer that is formed on the Sn coated layer. The Sn coated layer contains 300 mg/m$^2$ to 5.600 mg/m$^2$ of Sn in terms of an amount of metal Sn, and the chemical treatment layer contains 5 mg/m$^2$ to 30 mg/m$^2$ of a Zr compound in terms of an amount of metal Zr, and an average roughness Ra of an outermost surface of the chemical treatment layer obtained with a scanning probe microscope is 10 nm to 100 nm. A variation amount in a yellowness index measured at one measurement point on the outermost surface of the chemical treatment layer is defined as $\Delta YI$ represented by Equation (1), an average of absolute values of the $\Delta YI$ obtained at a plurality of the measurement points included in a unit area of the outermost surface is 5.0 or less.

$$\Delta YI = YI - YI_0 \tag{1}$$

where

YI: the yellowness index measured after the steel sheet for containers is subjected to a retort treatment at a temperature of 130° C. for 5 hours.

$YI_0$: the yellowness index measured before the retort treatment (2) In the steel sheet for containers according to (1), a Ni coated layer containing Ni may be formed under the Sn coated layer.

(3) In the steel sheet for containers according to (2), the Sn coated layer may contain 300 mg/m$^2$ to 3,000 mg/m$^2$ of Sn in terms of an amount of metal Sn.

(4) In the steel sheet for containers according to (3), the Ni coated layer may contain 5 mg/m$^2$ to 150 mg/m$^2$ of Ni in terms of an amount of metal Ni.

(5) In the steel sheet for containers according to (1), the Sn coated layer may contain a Sn alloy.

(6) In the steel sheet for containers according to any one of (2) to (4), the Sn coated layer may contain a Sn alloy and the Ni coated layer may contain a Ni alloy.

(7) In the steel sheet for containers according to any one of (1) to (6), the chemical treatment layer may contain 2 mg/m$^2$ to 20 mg/m$^2$ of a phosphate compound in terms of an amount of P.

(8) In the steel sheet for containers according to any one of (1) or (6), the chemical treatment layer may be formed by performing a cathode electrolytic treatment in a chemical treatment liquid that contains a Zr ion and a F ion.

(9) In the steel sheet for containers according to (7), the chemical treatment layer may be formed by performing a cathode electrolytic treatment in a chemical treatment liquid that contains a Zr ion, a F ion, and a P ion.

(10) According to another aspect of the present invention, there is provided a method for producing a steel sheet for containers including: a coating step of forming a Sn coated layer that contains a Sn on a surface of a steel sheet; a cathode electrolytic treatment step of forming a chemical treatment layer on a surface of the Sn coated layer using a chemical treatment liquid that contains at least a Zr ion and a F ion, by performing a first cathode electrolytic treatment in which the temperature of the chemical treatment liquid is 10° C. to 40° C., and a second cathode electrolytic treatment in which the temperature of the chemical treatment liquid is 45° C. to 60° C.; and a washing treatment step of performing a washing treatment using washing water at at least 40° C. or higher for 0.5 seconds or longer.

(11) In the method for producing a steel sheet for containers according to (10), in the coating step, a Ni coated layer may be formed on the surface of the steel sheet, and then the Sn coated layer may be formed on a surface of the Ni coated layer.

(12) The method for producing a steel sheet for containers according to (10) or (11) may include a reflow treatment step of alloying at least a part of a Sn which is contained in the Sn coated layer after the coating step.

(13) In the method for producing a steel sheet for containers according to any one of (10) to (12), the chemical treatment liquid may contain at least one kind of a phosphate ion, a nitrate ion, or an ammonium ion.

Effects of the Invention

According to each aspect, it is possible to provide a steel sheet for containers having excellent film adhesion, sulfide stain resistance, weldability, corrosion resistance, and lacquer adhesion, and a method for producing a steel sheet for containers.

EMBODIMENTS OF THE INVENTION

The inventors have intensively studied the applications of a chemical treatment layer that contains a Zr compound as a new film layer replacing a chromate film layer.

As a result, regarding a chemical treatment layer that contains a Zr compound or a chemical treatment layer, in which a Zr compound is contained, that further contains a phosphate compound, it was found that excellent film adhesion, sulfide stain resistance, weldability, lacquer adhesion, and corrosion resistance, which are equal to or higher than those of the chromate film layer in the related art can be obtained by defining the surface properties of a chemical treatment layer that is formed on a steel sheet and defining a variation amount ($\Delta YI$ value) in yellowness index (YI value) after a retort treatment is performed under specific conditions, and the present invention has completed.

Hereinafter, suitable embodiments of the present invention will be described in detail.

A method for forming a chemical treatment layer that contains a Zr compound on a steel sheet, in which a Sn coated layer is formed, by performing a cathode electrolytic treatment at a low temperature followed by at a high temperature using a solution that contains a Zr ion and a F ion (a chemical treatment liquid) will be described in detail. In addition, a steel sheet for containers in which the surface roughness of the chemical treatment layer and a variation amount ($\Delta YI$ value) in the yellowness index (YI value) after a retort treatment under specific conditions are defined will be described in detail.

First Embodiment

Figure 1:
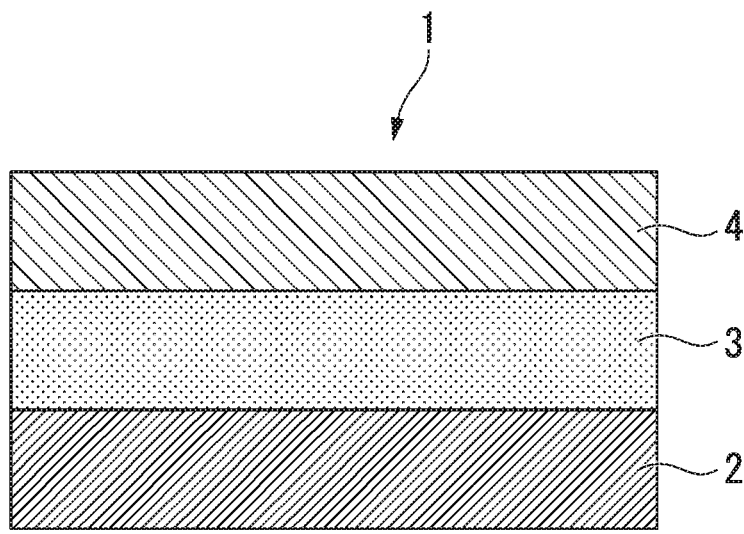
FIG. 1 is a view showing a configuration of a steel sheet for containers according to the first embodiment.

FIG. 1 is a view showing a configuration of a steel sheet 1 for a container according to a first embodiment of the present invention.

The steel sheet for containers 1 has a steel sheet 2, a Sn coated layer 3 that is formed on the steel sheet 2, and a chemical treatment layer 4 that is formed on the Sn coated layer 3.

The steel sheet 2 used in the embodiment is not particularly limited and a steel sheet that is typically used as a container material can be used. The method for producing the steel sheet and the material thereof are not particularly limited and the steel sheet may be produced through a typical production process such as making billet, hot rolling, pickling, cold rolling, annealing, and temper rolling.

A Sn content in the Sn coated layer 3 is 300 mg/m$^2$ to 5,600 mg/m$^2$ in terms of an amount of metal Sn.

In addition, "Sn coated layer" in the specification includes a coated layer containing metal Sn, a coated layer with metal Sn that inevitable impurities are mixed into thereof, and a coated layer with metal Sn to which small amounts of elements are added. The inevitable impurity mean an element inevitably mixed in manufacturing.

Sn has excellent workability, weldability, and corrosion resistance. However, in order to exhibit these effects, the amount of Sn required is 300 mg/m$^2$ or more in terms of the amount of metal Sn.

As the amount of metal Sn increases, the effects are enhanced. However, in the case where the amount of metal Sn is more than 5,600 mg/m$^2$, the effects are saturated. Therefore, from the economic viewpoint, the Sn content is set to 5,600 mg/m$^2$ or less in terms of the amount of metal Sn.

A more preferable range of the Sn content in the Sn coated layer 3 is 560 mg/m$^2$ to 5,600 mg/m$^2$ in the embodiment.

The amount of metal Sn in the Sn coated layer 3 can be measured by, for example, an X-ray fluorescence method. In this case, using a sample that the amount of metal Sn is known, the calibration curve regarding the amount of metal Sn is specified in advance, and the amount of metal Sn is relatively specified using the calibration curve.

The Sn coated layer 3 may be formed on both surfaces of the steel sheet 2 or may be formed on only one surface of the steel sheet 2 from the viewpoint of production cost reduction or the like. In the case where the steel sheet 2 on which the Sn coated layer 3 is formed on only one surface of the steel sheet 2 is subjected to can making, for example, it is preferable that the steel sheet is processed such that the surface on which the Sn coated layer 3 is formed becomes the inner surface of a container.

In the embodiment, a reflow treatment may be performed after forming the Sn coated layer 3. When the reflow treatment is performed, a part of Sn contained in the Sn coated layer 3 can be alloyed with Fe contained in the steel sheet 2. In the specification, a Sn coated layer 3 on which the reflow treatment is performed refers to a Sn alloy coated layer. The Sn alloy coated layer may contain Sn which is not alloyed (free Sn). In addition, it is defined in the specification that the Sn alloy coated layer refer to not only a state in which the Sn or Sn alloy coats the entire surface of the steel sheet 2, but also a state in which the surface of the steel sheet 2 is partially coated and a part of the steel sheet 2 is exposed (referred as an island-shaped Sn).

In the reflow treatment, the steel sheet 2 on which the Sn coated layer 3 is formed is heated to a melting point of Sn (232° C.) or more, the Sn coated layer 3 is fused, and then water cooling is performed.

The reason why the reflow treatment is performed is as follows.

Sn contained in the Sn coated layer 3 before the reflow treatment is performed is in the form of fine particles, has relatively weak adhesion and no luster. Corrosion resistance and appearance quality of the surface (mirror finish quality, and the like) can be further improved by performing the reflow treatment.

In the case where the Sn coated layer 3 is only formed on the surface of the steel sheet 2 (including a case where the Sn alloy coated layer is formed on the surface of the steel sheet 2 by performing the reflow treatment, after the Sn coated layer 3 is formed), although a film is attached to the surface of the Sn coated layer 3 or a lacquer is applied to the surface of the Sn coated layer 3, sulfur contained in beverages or foods penetrates film or lacquer, and is bonded to Sn, and then black SnS or SnS$_2$ may be formed in some cases.

In addition, in the case where the Sn coated layer 3 is not subjected to the reflow treatment, as described above, Sn contained in the Sn coated layer 3 is in the form of fine particles and its adhesion is relatively weak. Therefore, there is a coated deficient portion consisting of a plurality of fine pores (finely porous) in the Sn coated layer 3. In this case, sulfur is bonded to Fe contained in the steel sheet 2 and thus black FeS, Fe$_2$S$_3$, and Fe$_2$S are formed.

In order to reduce these blackening phenomena, the steel sheet for containers 1 according to the embodiment has the chemical treatment layer 4 on the Sn coated layer 3.

Among the surface of the chemical treatment layer 4, the surface roughness of the surface to which the film adheres (outermost surface) will be described.

The film adhesion includes mechanical adhesion (anchoring effect and the like), chemical adhesion (primary bonding and interatomic attractive force and the like), and physical adhesion (secondary bonding and intermolecular attractive force and the like). In the embodiment, among these, as a result of particularly paying attention on mechanical adhesion, the surface roughness of the surface of the chemical treatment layer 4 (specific surface area) is defined. By increasing the surface roughness (specific surface area), mechanical adhesion is increased and the film adherable area is increased. Thus, the effect of increasing the adherable area is exhibited in the chemical adhesion and the physical adhesion.

In the embodiment, the Zr content in the chemical treatment layer 4 is 5 mg/m$^2$ to 30 mg/m$^2$ in terms of an amount of metal Zr.

In the case where the Zr content is less than 5 mg/m$^2$, the surface roughness which will be described later cannot be stably obtained and thus this is not preferable. On the other hand, in the case where the Zr content is more than 30 mg/m$^2$, although the surface roughness can be stably obtained, weldability at the time of 3 piece can formation is not sufficient. Thus, this is not preferable.

The Zr content in the chemical treatment layer 4 is more preferably 6 mg/m$^2$ to 15 mg/m$^2$ in terms of the amount of metal Zr, and even more preferably 8 mg/m$^2$ to 13 mg/m$^2$ in terms of the amount of metal Zr.

Here, the Zr content in the chemical treatment layer 4 can be measured by, for example, an X-ray fluorescence method. In this case, using a sample that an amount of Zr is known, the calibration curve regarding the amount of Zr is specified in advance, and the Zr content is relatively specified using the calibration curve. It is more preferable that the calibration curve regarding the amount of Zr is specified on the Sn coated layer 3 in advance using a sample that an amount of Zr is known.

The average roughness (Ra) of a 5 μm square flat portion at arbitrary 20 points per 1 m$^2$ is 10 nm or more and 100 nm or less on the outermost surface of the chemical treatment layer 4.

In the case where the average roughness is less than 10 nm, although the primary adhesion of the film can be secured, the film adhesion (secondary adhesion) after processing such as can making and end processing cannot be stably secured in some cases. Thus, this is not preferable. In addition, in the case where the average roughness is more than 100 nm, it is difficult to set the Zr content in the chemical treatment layer 4 to 5 mg/m$^2$ to 30 mg/m$^2$, defective external appearance is exhibited, and the film adhesion effect is saturated. Thus, this is not preferable.

In the case where the thickness of the film is 5 μm or less, the surface properties of the film attached to the surface of the steel sheet for containers 1 are affected by the film in some cases and thus this is not preferable. The thickness of the film is preferably in a range of 5 μm to 80 μm, more preferably in a range of 10 μm to 60 μm, and even more preferably in a range of 15 μm to 45 μm.

For the method for measuring the average roughness (Ra), a device that can measure the average roughness (Ra) in the order of nm may be used. For example, a shape measuring device such as a scanning probe microscope (SPM) typified by a scanning tunneling microscope (STM) or an atomic force microscope (AFM) can be used.

The method in which the average roughness (Ra) of the 5 μm square flat portion at arbitrary 20 points per 1 m$^2$ on the outermost surface of the chemical treatment layer 4 is measured using the scanning probe microscope will be described.

The arbitrary 20 points per 1 m$^2$ means "arbitrary 20 points on a single surface in the outermost surface portion of the chemical treatment layer 4", and means measuring 40 points on both surfaces. It is preferable that the measurement points are set to points which are spaced away from each other by at least 10 cm.

Specifically, in a case of a large sheet having a dimension of 1 m×1 m, it is preferable that measurement points are sampled, and points spaced away from each other by 10 cm or more are sampled to perform measurement.

The scanning area in the measurement conditions for each point is preferably 5 μm×5 μm. In addition, the main measurement conditions such as the number of data points may be in accordance with the measurement conditions of Table 1.

The definition of the average roughness (Ra) is described in international standard ISO 4287, is an arithmetic average height of roughness curves, and is defined as an average of absolute value deviations from the average line. The average roughness may be calculated in accordance with the same definition.

TABLE 1

| | | |
|---|---|---|
| Cantilever used | Manufacturing maker | NCH-10T manufactured by Nano World AG (for tapping (non-contact) mode measurement) |
| | Material | n+ single crystal silicon (conductivity: 0.01 Ωcm to 0.02 Ωcm) |
| | Spring constant | 39 N/m |
| | Resonance frequency | 326 kHz |
| | Thickness of cantilever | 4.01 μm |
| | Width of cantilever | 32 μm |
| | Length of Probe | 127 μm |
| Main measurement conditions | Kind of machine used | Nano Scope III (manufactured by Veeco Instruments Inc.) |
| | Measurement mode | Tapping (non-contact) mode |
| | Measurement image | Uneven image |
| | Scanning area | 5 μm × 5 μm |
| | Number of data points | 512 × 512 |
| | Scan rate | 0.8 Hz to 1.0 Hz |
| Cantilever excitation setting | Frequency | 290 kHz to 310 kHz |
| | Excitation voltage | 50 mV to 90 mV |

In the case where a roughness of the chemical treatment layer 4 is measured using the scanning probe microscope, the roughness of the chemical treatment layer 4 is affected by the roughness of the Sn coated layer 3 or the like below the chemical treatment layer 4 in some cases. The average roughness in the embodiment refers to the roughness of the outermost surface of the chemical treatment layer 4 including the effect of the roughness of the Sn coated layer 3 or the like. In addition, in the case where the measurement surface is curved, it is preferable that the surface is appropriately corrected to be flat. Further, regarding the curved portion out of the correction range, another portion is preferably measured.

In the embodiment, a variation amount in a yellowness index measured at one measurement point on the outermost surface of the chemical treatment layer 4 is defined as ΔYI. Here, the variation amount (ΔYI value) in the yellowness index (YI value) means a difference between the YI value of the steel sheet for containers 1, and the YI value obtained by performing a retort treatment at a temperature of 130° C. for 5 hours on the the steel sheet for containers 1.

In addition, In the embodiment, an average of absolute values of the ΔYI obtained at a plurality of the measurement points included in a unit area of the outermost surface of the is 5.0 or less.

The retort treatment means that the steel sheet for containers 1 having the Sn coated layer 3 and the chemical treatment layer 4 according to the embodiment is treated using a device (high pressure steam sterilizer) for a sterilization treatment (autoclave sterilization, high pressure steam sterilization) by saturated steam at high temperature and high pressure.

An oil that is generally applied to the surface of the steel sheet for containers for the purpose of anticorrosion, such as DOS (bis (2-ethylhexyl) sebacate) or ATBC (2-(acetyloxy)-1, 2, 3-propanetricarboxylic acid tributyl), may be applied to the surface of the steel sheet for containers 1.

In the retort treatment, a state in which the temperature in the device is 130° C. is maintained for 5 hours. The temperature rising time and temperature dropping time are not included in the treatment time. Since it is considered that the temperature rising time and temperature dropping time vary according to a device, it is preferable that the conditions are matched in a range of +20 minutes.

The yellowness index (YI value) is a degree of discoloration of hue in a yellow direction from colorless or white, and in the case where the hue is discolored in a yellow direction from colorless or white, the yellowness index is expressed as a positive amount. The case in which the yellowness index is expressed as a negative value shows that the hue is discolored in a blue direction. The yellowness index is calculated by obtaining tristimulus values X, Y, and Z using a color difference meter, and substituting these values into Equation (2).

$$YI\ Value = 100 \times (1.28X - 1.06Z)/Y \quad (2)$$

The yellowness index (YI value) is a value obtained by digitalizing tristimulus values of color (perception sensitivity of red, blue, and yellow that human eye can sense), and as the YI value exhibits a higher value on the positive side, the steel sheet is more likely to be tinged with yellow, and as the YI value exhibits a higher value on the negative side, the steel sheet is more likely to be tinged with bluish white.

As described above, the variation amount (ΔYI value) in the yellowness index (YI value) means a difference between the YI value of the steel sheet for containers 1, and the YI value obtained by performing a retort treatment at 130° C. for 5 hours on the steel sheet for containers 1. That is, the variation amount (ΔYI value) in the yellowness index (YI value) is calculated by Equation (1).

$$\Delta YI = YI - YI_0 \quad (1)$$

where

YI: the yellowness index measured after the steel sheet for containers is subjected to a retort treatment at a temperature of 130° C. for 5 hours.

$YI_0$: the yellowness index measured before the retort treatment

Accordingly, the case in which the variation amount ΔYI of the yellowness index is a positive amount shows that the yellowness index of the steel sheet for containers 1 is increased by the retort treatment. On the other hand, the case in which the variation amount ΔYI of the yellowness index is a negative amount shows that the yellowness index of the steel sheet for containers 1 is reduced by the retort treatment, and the steel sheet for containers 1 is tinged with bluish white.

By forming the chemical treatment layer 4 on the Sn coated layer 3, the YI value has a higher positive value in many cases. This is because the chemical treatment layer 4 itself is white to light yellow.

In addition, as the amount of Zr in the chemical treatment layer 4 increases, the YI value tends to have a higher positive value. This is because, as described above, the chemical treatment layer 4 itself is white to light yellow and the degree of tone of light yellow is emphasized with containing of Zr.

On the other hand, by forming the chemical treatment layer 4 on the Sn coated layer 3 and performing a retort treatment at a temperature of 130° C. for 5 hours, the ΔYI value often has a negative value in many cases. However, the ΔYI value may be a positive value in some cases. Although described later, in the case where the ΔYI value is positive or the ΔYI value is negative, there is a correlation between the magnitude of the ΔYI value (that is, degree of variation of yellowness index) and sulfide stain resistance. Therefore, in the embodiment, the absolute value of the ΔYI value is used as an index for sulfide stain resistance.

The measurement of the yellowness index (YI value) in the embodiment may be performed using a spectral colorimeter in accordance with condition c of JIS Z-8722. For the measurement method of the yellowness index (YI value), SCI (including regular reflection light) measurement which is hardly affected by the surface properties is performed. For the measurement conditions of the yellowness index (YI value), measurement must be performed under predetermined conditions including the light source, humidity, temperature, and the like.

In the embodiment, the absolute value of the ΔYI value which is a variation amount in the yellowness index (YI value) is used as an index for indicating the degree of coating of the Sn coated layer 3 and the chemical treatment layer 4. In the case where the Sn coated layer 3 or the chemical treatment layer 4 is defective, the ΔYI value which is a variation amount in the yellowness index (YI value) has a high value. On the other hand, in the case where the Sn coated layer 3 or the chemical treatment layer 4 is not defective, the ΔYI value which is a variation amount in the yellowness index (YI value) has a low value.

Examples of the case in which the Sn coated layer 3 or the chemical treatment layer 4 is defective include a case in which the chemical treatment layer 4 is not uniform due to a finely porous defect, and a case in which the Sn coated layer 3 is oxidized by the retort treatment.

In each measurement point, the absolute value of the ΔYI value is calculated by the above method and all of the obtained "absolute values of the ΔYI values" is averaged by the number of measurement points. In the embodiment, this value is set to the average value of the absolute values of the variation amount (ΔYI values) in the yellowness index (YI value) at arbitrary 20 points per 1 $m^2$ after a retort treatment is performed at 130° C. or less for 5 hours.

In the case where the average of the absolute values of the ΔYI values is 5.0 or less, dense and uniform Sn coated layer 3 and chemical treatment layer 4 are formed.

In the case where the average of the absolute values of the ΔYI values is more than 5.0, at least one of dense and uniform Sn coated layer 3 and chemical treatment layer 4 is not formed.

Thus, the average of the absolute values of the ΔYI values is 5.0 or less. The average of the absolute values of the ΔYI values is preferably 3.0 or less, more preferably 1.0 or less, and even more preferably 0.5 or less.

The inventors have found that the absolute values of the ΔYI values represent the degree of coating of the chemical treatment layer 4 and there is a correlation between the sulfide stain resistance and the ΔYI value. That is, in the case where the average of the absolute values of the ΔYI values is a high value, the steel sheet for containers 1 does not have excellent sulfide stain resistance, and in the case where the average of the absolute values of the ΔYI values is a low value, the steel sheet for containers 1 has excellent sulfide stain resistance.

In the retort treatment, since a water molecule or an oxygen molecule enters the chemical treatment layer 4 from a portion with a low coating degree, a metal such as Sn in the Sn coated layer 3 which is below the chemical treatment layer 4, further iron in the steel sheet 2, is oxidized. That is, the oxidation state of the metal such as Sn and iron by the retort treatment is affected by the degree of coating of the Sn coated layer 3 and the chemical treatment layer 4.

On the other hand, the ΔYI value represents a variation amount in the yellowness index of the steel sheet for containers 1. Here, the yellowness index of the steel sheet for containers 1 is affected by the oxidation state of the metal such as Sn and iron.

Therefore, it is considered that the average of the absolute values of the ΔYI values represents the degree of coating of the chemical treatment layer 4.

On the other hand, since a hydrogen sulfide molecule, a thiol ion, or a sulfur molecule enters the chemical treatment layer 4 from a portion with a low coating degree, the metal such as Sn in the Sn coated layer 3 which is below the chemical treatment layer 4, further iron in the steel sheet 2, is sulfurized. As a result, a metal sulfide is formed to cause the sulfide stain. That is, the sulfide stain resistance is affected by the degree of coating of the Sn coated layer 3 and the chemical treatment layer 4.

For the above reasons, it is considered that the ΔYI value which represents the variation amount in the yellowness index of the steel sheet for containers 1 and the sulfide stain resistance have a correlation.

The inventors obtained the findings that since the steel sheet for containers 1 exhibits excellent film adhesion and excellent sulfide stain resistance, it is preferable to form two layers having different functions for the chemical treatment layer 4.

Based on the finding, in the embodiment, the chemical treatment layer 4 has a uniform and dense layer on the Sn coated layer 3 to make an extraneous molecule such as a water molecule or a hydrogen sulfide molecule hardly penetrate the layer from the surface, and has a layer with high roughness on the uniform and dense layer to secure the film adhesion.

In the specification, the former uniform and dense layer is referred to as a first chemical treatment layer and the latter layer with high roughness is referred to as a second chemical treatment layer.

In the embodiment, the chemical treatment layer 4 is formed to secure the sulfide stain resistance, corrosion resistance, and film adhesion. It is considered that the Zr compound contained in the chemical treatment layer 4 is a Zr hydrated oxide constituted of a Zr oxide and a Zr hydroxide. In the case where the chemical treatment liquid further contains a phosphate ion, it is considered that the Zr compound contained in the chemical treatment layer 4 is a Zr hydrated oxide-phosphate compound. These Zr compounds have excellent sulfide stain resistance, corrosion resistance, and film adhesion.

Accordingly, in the case where the amount of the Zr compound in the chemical treatment layer 4 is increased, the sulfide stain resistance, corrosion resistance, and film adhesion are improved. In the case where the amount of the Zr compound in the chemical treatment layer 4 is 4 mg/m$^2$ or more in terms of the amount of metal Zr, the effects are exhibited.

The amount of the Zr compound in the first chemical treatment layer is preferably 4 mg/m$^2$ or more, more preferably 6 mg/m$^2$ or more, and even more preferably 8 mg/m$^2$ or more in terms of the amount of metal Zr.

The amount of the Zr compound in the second chemical treatment layer is preferably 1 mg/m$^2$ or more, more preferably 3 mg/m$^2$ or more, and even more preferably 6 mg/m$^2$ or more in terms of the amount of metal Zr.

As the amount of the Zr compound increases, the sulfide stain resistance, corrosion resistance, and film adhesion are improved. However, in the case where the total amount of the Zr compound contained in the first chemical treatment layer and the second chemical treatment layer is more than 30 mg/m$^2$ in terms of the amount of metal Zr, the thickness of the chemical treatment layer 4 is excessively increased and the adhesion of the chemical treatment layer 4 itself is deteriorated. Further, since the electric resistance of the chemical treatment layer 4 is increased, weldability of the steel sheet for containers 1 is deteriorated.

Further, in the case where the total amount of the Zr compound contained in the first chemical treatment layer and the second chemical treatment layer is more than 30 mg/m$^2$ in terms of the amount of metal Zr, a powdered Zr compound is precipitated on the surface of the chemical treatment layer 4 (that is, the surface of the second chemical treatment layer) in some cases.

Accordingly, the amount of the Zr compound of the first chemical treatment layer is preferably 20 mg/m$^2$ or less, more preferably 15 mg/m$^2$ or less, and even more preferably 10 mg/m$^2$ or less in terms of the amount of metal Zr.

In addition, the amount of the Zr compound of the second chemical treatment layer is preferably 10 mg/m$^2$ or less, more preferably 8 mg/m or less, and even more preferably 5 mg/m$^2$ or less in terms of the amount of metal Zr.

In consideration of the above description, the total amount of the Zr compound contained in the chemical treatment layer 4 is set to 5 mg/m$^2$ to 30 mg/m$^2$ in terms of the amount of metal Zr.

In the case where the amount of the phosphate compound in the chemical treatment layer 4 such as a Zr-phosphate compound is increased, further excellent sulfide stain resistance, corrosion resistance, and film adhesion are exhibited. However, the effect can be recognized in the case where the amount of the phosphate compound is 0.5 mg/m$^2$ or more in terms of an amount of P, and the effect can be apparently recognized in the case where the amount of the phosphate compound is 2 mg/m$^2$ or more in terms of the amount of P.

Accordingly, the amount of the phosphate compound in the first chemical treatment layer such as a Zr-phosphate compound is preferably 2 mg/m$^2$ or more, more preferably 3 mg/m$^2$ or more, and even more preferably 4 mg/m$^2$ or more in terms of the amount of P.

In addition, the amount of the phosphate compound in the second chemical treatment layer such as a Zr-phosphate compound is preferably 0.5 mg/m$^2$ or more, more preferably 1.5 mg/m$^2$ or more, and even more preferably 3 mg/m or more in terms of the amount of P.

On the other hand, in the case where the amount of the phosphate compound such as a Zr-phosphate compound is increased, the sulfide stain resistance, corrosion resistance, and film adhesion are improved. However, in the case where the amount of the phosphate compound such as a Zr-phosphate compound in the chemical treatment layer 4 is more than 20 mg/m$^2$ in terms of the amount of P, the phosphate compound such as a Zr-phosphate compound is excessively thickened. Therefore, the adhesion of the phosphate compound itself is deteriorated. In addition, since the electric resistance of the chemical treatment layer 4 is increased, the weldability of the steel sheet for containers 1 is deteriorated. Further, in the case where the amount of the phosphate compound in the chemical treatment layer 4 such as a Zr-phosphate compound is more than 20 mg/m$^2$ in terms of the amount of P, a powdered Zr—P compound is precipitated on the surface of the chemical treatment layer 4 in some cases.

Accordingly, the amount of the phosphate compound in the first chemical treatment layer such as a Zr-phosphate compound is preferably 15 mg/m$^2$ or less, more preferably 10 mg/m$^2$ or less, and even more preferably 8 mg/m$^2$ or less in terms of the amount of P.

In addition, the amount of the phosphate compound in the second chemical treatment layer such as a Zr-phosphate compound is preferably 8 mg/m$^2$ or less, more preferably 5 mg/m$^2$ or less, and even more preferably 3 mg/m$^2$ or less in terms of the amount of P.

As described above, the total amount of the phosphate compound contained in the chemical treatment layer 4 such as a Zr-phosphate compound is preferably set to 2 mg/m$^2$ to 20 mg/m$^2$ in terms of the amount of P. The amount of the phosphate compound such as a Zr-phosphate compound is more preferably 4 mg/m$^2$ to 15 mg/m$^2$ and the amount of the phosphate compound such as a Zr-phosphate compound is even more preferably 2.5 mg/m$^2$ to 10 mg/m$^2$.

Although the details will be described later, it is preferable that the chemical treatment liquid does not contain an organic substance such as a phenol resin to stably form the chemical treatment layer 4. Therefore, it is preferable that the chemical treatment layer 4 does not contain an organic substance such as a phenol resin.

The amounts of metal Zr and P contained in the chemical treatment layer 4 and the amount of metal Sn in the Sn coated layer 3 in the embodiment can be measured by, for example, a quantitative analysis method such as an X-ray fluorescence method. In this case, using a sample of a Sn coated steel sheet that the amount of metal Sn is known, the calibration curve regarding the amount of metal Sn can be specified in advance, and the amount of metal Sn can be relatively specified using the calibration curve.

In addition, using a sample that the amount of metal Zr is known and a sample that the amount of P is known, the calibration curve regarding the amount of metal Zr and, the calibration curve regarding the amount of P can be specified in advance, and the amounts of metal Zr and P can be relatively specified using the calibration curves.

Hereinafter, a method for producing the steel sheet for containers 1 according to the embodiment will be described.

Figure 3:
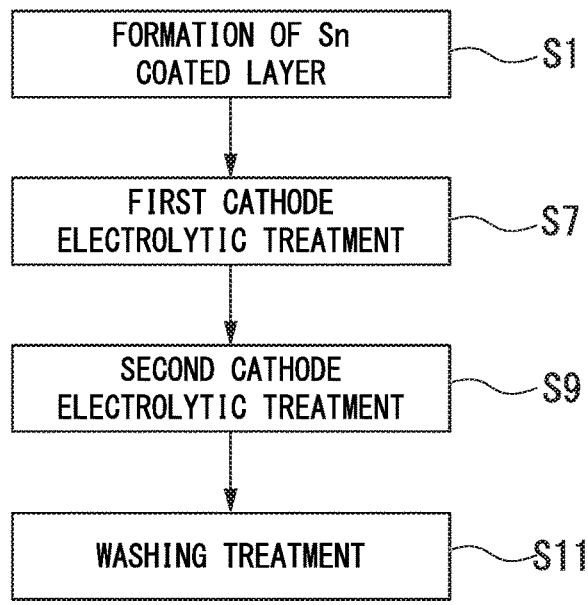
FIG. 3 is a flowchart showing an example of a method for producing a steel sheet for containers according to the first embodiment.

FIG. 3 is a flowchart showing an example of a method for producing the steel sheet for containers 1 according to the first embodiment.

In the embodiment, the Sn coated layer 3 is formed on at least one surface of the steel sheet 2 (Step S3). The method for forming the Sn coated layer 3 is not particularly limited. For example, a known technique such as an electro coating method, a vacuum deposition method, or a sputtering method may be used in the ferrostan bath.

As described above, the reflow treatment may be performed after the Sn coated layer 3 is formed. As the conditions for the reflow treatment, for example, a heat treatment is performed at 232° C. (melting point of Sn) to 280° C. for 0.5 seconds to 30 seconds so as to fuse the Sn coated layer, and immediately water cooling is performed.

Examples of the method for forming the chemical treatment layer 4 include an immersion treatment and a cathode electrolytic treatment.

The immersion treatment is a method for immersing the steel sheet 2 on which the Sn coated layer 3 is formed in an acid solution obtained by dissolving a Zr ion and a F ion (as required, a phosphate ion). However, since the chemical treatment layer 4 is formed by etching the base material (Sn coated layer 3) in the immersion treatment, the adhesion of the chemical treatment layer 4 is not uniform. In addition, since the time required for forming the chemical treatment layer 4 is increased, this method is disadvantageous in terms of industrial production.

On the other hand, in the cathode electrolytic treatment, the surface of the chemical treatment layer 4 to be formed is cleaned by hydrogen generation in forced charge transfer and at the interface between the steel sheet 2 and the chemical treatment liquid. In addition, in the cathode electrolytic treatment, the pH of the chemical treatment liquid is raised, thereby promoting the adhesion of the chemical treatment layer 4.

For the above reasons, by performing the cathode electrolytic treatment on the steel sheet 2 on which the Sn coated layer 3 is formed, a uniform chemical treatment layer 4 can be formed.

In the embodiment, by performing the cathode electrolytic treatment on the steel sheet 2 on which the Sn coated layer 3 is formed in the chemical treatment liquid containing a Zr ion and a F ion, a chemical treatment layer 4 containing a Zr oxide is formed. By performing the cathode electrolytic treatment in the chemical treatment liquid to which a phosphate is added, a chemical treatment layer 4 containing both a Zr oxide and a Zr phosphate compound is formed.

In the method for producing the steel sheet for containers 1 according to the embodiment, the chemical treatment layer 4 is formed by a cathode electrolytic treatment using at least two or more cathode electrolytic treatment tanks. In the cathode electrolytic treatment, a first cathode electrolytic treatment in which the temperature of the chemical treatment liquid is set to 10° C. to 40° C. (Step S7) is performed and then subsequently a second cathode electrolytic treatment in which the temperature of the chemical treatment liquid is set to 45° C. to 60° C. (Step S9) is performed.

Through the above first cathode electrolytic treatment, a first chemical treatment layer is formed on the Sn coated layer 3. Through the above second cathode electrolytic treatment, a second chemical treatment layer is formed on the first chemical treatment layer.

By performing the first cathode electrolytic treatment in which the temperature of the chemical treatment liquid is set to 10° C. to 40° C., the dense first chemical treatment layer is formed to secure the sulfide stain resistance and corrosion resistance.

By performing the second cathode electrolytic treatment in which the temperature of the chemical treatment liquid is set to 45° C. to 60° C., the second chemical treatment layer is formed to mainly secure the film adhesion and lacquer adhesion.

Techniques for forming a chemical treatment layer 4 containing a Zr compound by performing a cathode electrolytic treatment in a chemical treatment liquid containing at least a Zr ion and a F ion have been disclosed in the above patent documents and the like. However, techniques for multilayering the chemical treatment layer 4 by changing the conditions of the cathode electrolytic treatment in stages have not been disclosed in the above patent documents and the like.

However, only with the second cathode electrolytic treatment, it is considered that the formation of the chemical treatment layer 4 containing a Zr compound is effectively promoted, however, the density of the chemical treatment layer 4 is not sufficient, that is, the chemical treatment layer 4 having a finely porous defect is obtained. Therefore, it is difficult to secure the sulfide stain resistance and corrosion resistance in some cases.

The temperature of the chemical treatment liquid in the first cathode electrolytic treatment is 10° C. to 40° C.

In the case where the temperature of the chemical treatment liquid is lower than 10° C., it is required to enhance the capacity of a cooling device. Even in the case where the temperature of the chemical treatment liquid is lowered to a temperature lower than 10° C., the density of the chemical treatment layer 4 is saturated and thus a denser chemical treatment layer 4 cannot be formed. In the case where the temperature of the chemical treatment liquid is lower than 10° C., the formation speed of the chemical treatment layer 4 is slow. In the case where the temperature of the chemical treatment liquid is lower than 10° C., the solubility of the components of the chemical treatment liquid is lowered and thus insoluble matter is formed. For the above reasons, it is not preferable that the temperature of the chemical treatment liquid is lower than 10° C.

On the other hand, in the case where the temperature of the chemical treatment liquid is higher than 40° C. a denser chemical treatment layer 4 cannot be formed and it is difficult to secure the sulfide stain resistance and corrosion resistance. Therefore, it is difficult to exhibit the function as the above first chemical treatment layer.

The temperature of the chemical treatment liquid in the first cathode electrolytic treatment is preferably 20° C. to 35° C.

The temperature of the chemical treatment liquid in the second cathode electrolytic treatment is 45° C. to 60° C.

In the case where the temperature of the chemical treatment liquid is lower than 45° C., it is difficult to secure the surface roughness that is defined in the embodiment.

On the other hand, in the case where the temperature of the chemical treatment liquid is higher than 60° C., the surface roughness that is defined in the embodiment can be secured. However, the stability of the chemical treatment liquid cannot be secured. Particularly, in the case of continuously performing the cathode electrolytic treatment, a F complex component of Zr or the like is gradually decomposed and becomes insoluble matter, and the insoluble matter is suspended in the treatment liquid. Thus, the insoluble matter adheres to the surface of the chemical treatment layer 4 or the like to cause an adverse effect.

The temperature of the chemical treatment liquid in the second cathode electrolytic treatment is preferably 45° C. to 55° C.

In the case where the line speed is faster than 150 m/minute, it is required that the temperature of the chemical treatment liquid in the second cathode electrolytic treatment is set to a high temperature 10° C. or more higher than the temperature of the chemical treatment liquid in the first cathode electrolytic treatment. This is because, for example, in some cases, as the line speed increases, the temperature of the chemical treatment liquid of the second cathode electrolytic treatment tank is lowered by the chemical treatment liquid of the first cathode electrolytic treatment tank adhering to the steel sheet and entering the second cathode electrolytic treatment tank, and as a result, the second chemical treatment layer of the chemical treatment layer 4 having two layers structure of the present invention may be prevented from being effectively formed.

Although current density varies depending on the structure of a cathode electrolytic treatment device or in the case of a long steel sheet, the sheet threading speed, the current density is, for example, 0.1 A/dm$^2$ to 20 A/dm$^2$.

In the method for producing the steel sheet for containers 1 of the embodiment, it is preferable to use at least two or more cathode electrolytic treatment tanks. This is because at least one tank functions as a cathode electrolytic treatment tank for the first cathode electrolytic treatment and at least one tank functions as a cathode electrolytic treatment tank for the second cathode electrolytic treatment.

The cathode electrolytic treatment tank may be of a vertical type or a horizontal type and is not particularly limited as long as the tank has a structure capable of performing a cathode electrolytic treatment on the front and rear surfaces of the steel sheet.

In the embodiment, as the chemical treatment liquid, a known chemical treatment liquid can be used. For example, as described in Patent Documents 9 and 10, the chemical treatment liquid containing 100 ppm to 7,500 ppm of Zr ions and 120 ppm to 4,000 ppm of F ions can be used.

In addition, as the chemical treatment liquid to be used in the cathode electrolytic treatment, a chemical treatment liquid containing 50 ppm to 5,000 ppm of phosphate ions, or 20,000 ppm or less of nitrate ions, ammonium ions and the like, in addition to the Zr ions and F ions, may be used.

The pH of the chemical treatment liquid is preferably in a range of 3.0 to 4.5. The pH may be appropriately adjusted such that in the case of an attempt to lower the pH, nitrate or the like is added and in the case of an attempt to raise the pH, ammonium or the like is added.

In order to secure further excellent film adhesion, sulfide stain resistance, and corrosion resistance, it is preferable that not only a Zr ion and a F ion, but also a phosphate ion are added.

It is more preferable that a nitrate ion is contained in the chemical treatment liquid together with an ammonium ion. The treatment time for the cathode electrolytic treatment can be shortened by containing the above ions in the chemical treatment liquid. In addition, by containing the above ions in the chemical treatment liquid, the precipitation of the chemical treatment layer 4 containing a Zr oxide and a Zr-phosphate compound contributing to improving the corrosion resistance and film adhesion can be promoted. Thus, the containing of the ions in the chemical treatment liquid is very advantageous in terms of industrial production.

Accordingly, for the formation of the chemical treatment layer 4 of the embodiment, it is preferable that the cathode electrolytic treatment is used. Particularly, it is more desirable to perform the cathode electrolytic treatment using the chemical treatment liquid containing a nitrate ion and an ammonium ion.

When a film is formed by performing a continuous electrolytic treatment using a chemical treatment liquid containing an organic substance such as a phenol resin, the organic substance such as a phenol resin is decomposed on an anode or the organic substance such as a phenol resin is inevitably insolubilized by interaction with a metal ion in some cases. Therefore, it is difficult to appropriately maintain the concentration of the organic substance such as a phenol resin contained in the chemical treatment liquid.

For the above reason, since there is a case in which a film containing the organic substance such as a phenol resin cannot be stably formed and thus it is desirable that the chemical treatment liquid does not contain the organic substance such as a phenol resin.

Since the chemical treatment liquid contains a F ion, the F ion is contained in the chemical treatment layer 4 with the Zr compound. Although the primary lacquer adhesion is not affected by the F ion in the chemical treatment layer 4, the secondary lacquer adhesion and corrosion resistance are deteriorated due to the F ion. This is because due to the elution of the F ion in the chemical treatment layer 4 into steam or a corrosive liquid, the F ion decomposes the bonding of the chemical treatment layer 4 and an organic film layer such as a film and a lacquer or corrodes the steel sheet 2.

In order to reduce the amount of the F ion in the chemical treatment layer 4, the second cathode electrolytic treatment is performed and then the steel sheet for containers 1 is subjected to a washing treatment (Step S11). Examples of the washing treatment include an immersion treatment and a spraying treatment.

The amount of the F ion in the chemical treatment layer 4 can be reduced by increasing the temperature of washing water used for the washing treatment and increasing the treatment time for the washing treatment.

In order to reduce the amount of the F ion in the chemical treatment layer 4, an immersion treatment or a spraying treatment using washing water at 40° C. or higher may be performed for 0.5 seconds or longer. In the case where the temperature of the washing water is lower than 40° C. or the treatment time is shorter than 0.5 seconds, the amount of F ion in the chemical treatment layer 4 cannot be reduced and the above properties cannot be exhibited.

Not only the F ion, but also the nitrate ion and the ammonium ion in the chemical treatment liquid are also contained in the chemical treatment layer 4 together with the Zr compound in some cases. In the case of reducing the amounts of these ions, a washing treatment using the washing water by an immersion treatment or a spraying treatment may be performed.

In the case of reducing the amounts of the nitrate ion and the ammonium ion in the chemical treatment layer 4, the amounts of the nitrate ion and the ammonium ion can be reduced by increasing the temperature of the washing water or increasing the treatment time.

It is preferable that the F ion, the nitrate ion, and the ammonium ion are removed from the chemical treatment layer 4 as much as possible by the immersion treatment or spraying treatment. However, these ions may not be necessary completely removed and may inevitably remain.

Second Embodiment

Figure 2:
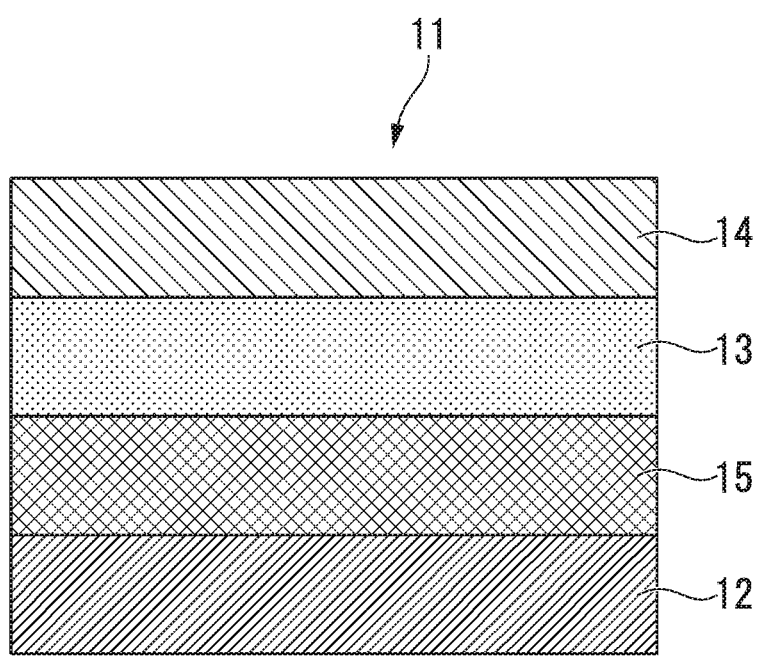
FIG. 2 is a view showing a configuration of a steel sheet for containers according to the second embodiment.

FIG. 2 is a view showing a configuration of a steel sheet for containers 11 according to the second embodiment.

The steel sheet for containers 11 has a steel sheet 12, a Ni coated layer 15 that is formed on the steel sheet 12, a Sn coated layer 13 that is formed on the Ni coated layer 15 and a chemical treatment layer 14 that is formed on the Sn coated layer 13.

The Ni coated layer 15 is formed on at least one surface of the steel sheet 12. The Ni coated layer 15 may be configured with metal Ni or Fe—Ni alloy coating.

Ni is a metal that has excellent corrosion resistance. Therefore, the steel sheet for containers 11 has the Ni coated layer 15, so that the corrosion resistance can be secured.

As the Ni content of the Ni coated layer 15 increases, the corrosion resistance is improved. In the case where the Ni content is 5 mg/m$^2$ or more in terms of metal Ni, excellent corrosion resistance can be secured. On the other hand, in the case where the Ni content is more than 150 mg/m$^2$ in terms of metal Ni, the effects are saturated. In addition, since Ni is an expensive metal, in the case where the Ni content is more than 150 mg/m$^2$ in terms of metal Ni, it brings an economically disadvantageous.

Therefore, it is preferable that the Ni content is 5 mg/m$^2$ to 150 mg/m$^2$ in terms of metal Ni.

The Sn coated layer 13 is formed to secure the corrosion resistance and weldability.

In the case where the Sn content in the Sn coated layer 13 is 300 mg/m$^2$ or more in terms of the amount of metal Sn, the corrosion resistance can be exhibited by Sn. Therefore, the amount of metal Sn in the Sn coated layer 13 is set to 300 mg/m$^2$ or more in the embodiment.

In the case where the amount of metal Sn is more than 5,600 mg/m$^2$ the above effect is saturated. Therefore, from the economic viewpoint, the Sn content is set to 5,600 mg/m$^2$ or less.

A more preferable range of the Sn content in the Sn coated layer 13 is 300 mg/m$^2$ to 3,000 mg/m$^2$ in the embodiment. In the case where the Sn content in the Sn coated layer 13 is 300 mg/m$^2$ to 3,000 mg/m$^2$ and the reflow treatment is performed after the Sn coated layer 13 is formed (Sn alloy coated layer is formed), the Sn alloy coated layer is formed into an island-shaped. Compared to the case where the Sn alloy coated layer uniformly coats the steel plate 2, more excellent corrosion resistance and weldability can be exhibited by forming the Sn alloy coated layer into an island-shaped.

In the embodiment, a reflow treatment may be performed after forming the Sn coated layer 13 as in the first embodiment.

By the reflow treatment, a Ni alloy coated layer that contains a Fe—Ni alloy or Sn—Fe—Ni alloy is formed on the steel sheet 2, and a Sn alloy coated layer is formed on the Ni alloy coated layer.

In the specification, a Ni coated layer 15 on which the reflow treatment is performed refers to a Ni alloy coated layer. As described above, the Ni alloy coated layer contains Fe—Ni alloy or Sn—Fe—Ni alloy, and may contain Ni which is not alloyed (free Ni).

The Sn alloy coated layer contains Sn—Fe alloy or Sn—Fe—Ni alloy, and may contain Sn which is not alloyed (free Sn). As described above, in the case where the Sn content in the Sn coated layer 13 is 300 mg/m$^2$ to 3,000 mg/m$^2$, the Sn alloy coated layer is formed into an island-shaped. In the case where the Sn alloy coated layer is formed into an island-shaped, the Ni alloy coated layer which is a lower layer is exposed.

The Ni coated layer 15 and the Sn coated layer 13 may not be formed on both surfaces of the steel sheet 2 from the viewpoint of production cost reduction or the like. This point is the same as in the first embodiment.

The chemical treatment layer 14 in the embodiment has the same structure and composition as the chemical treatment layer 4 in the first embodiment. Thus, descriptions will be omitted. In addition, it is preferable that the chemical treatment layer 14 does not contain the organic substance such as a phenol resin. This point is the same as in the first embodiment.

Hereinafter, a method for producing the steel sheet for containers 11 according to the second embodiment will be described.

Figure 4:
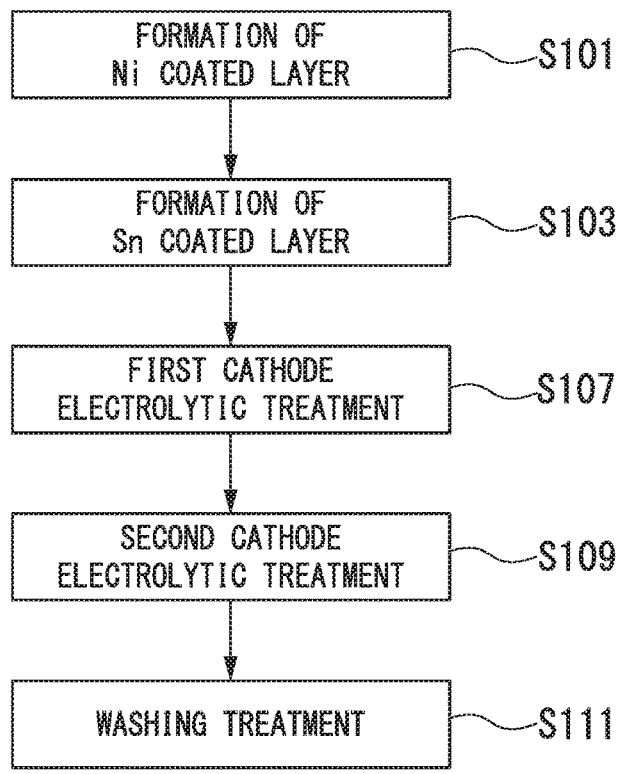
FIG. 4 is a flowchart showing an example of a method for producing a steel sheet for containers according to the second embodiment.

FIG. 4 is a flowchart showing an example of a method for producing the steel sheet for containers 11 according to the second embodiment.

In the embodiment, the Ni coated layer 15 is formed on at least one surface of the steel sheet 12 (Step S101). As the methods for Ni coating and Fe—Ni alloy coating, for example, a known technique (for example, cathode electrolytic method) which is performed in an electro coating method can be used.

In the case where the Ni coated layer 15 is formed by diffusion coating method, a diffusion treatment for forming a diffusion layer is performed in an annealing furnace after the Ni coated layer 15 is formed on the surface of the steel sheet 12. However, nitriding may be performed before or after the diffusion treatment or simultaneously with the diffusion treatment. Even when the nitriding is performed, the effect of Ni as the Ni coated layer 15 in the embodiment and the effect of the nitrided layer do not interfere with each other, and these effects can be exhibited together.

After Ni coating or Fe—Ni coating described above, the Sn coated layer 13 is formed (Step S103).

The method for forming the Sn coated layer 13 is not particularly limited. For example, a known electro coating method or a method for coating by immersing a steel sheet 12 into molten Sn may be used.

The reflow treatment may be performed after the Sn coated layer 13 as described above is formed. The effect obtained by reflow treatment is as described above. As the conditions for the reflow treatment, for example, a heat treatment is performed at 232° C. (melting point of Sn) to 280° C. for 0.5 seconds to 30 seconds so as to fuse the Sn coated layer, and immediately water cooling is performed.

After the Sn coated layer 13 is formed, the chemical treatment layer 14 is formed.

A method for forming the chemical treatment layer 14 in the embodiment, which is the same method for forming a chemical treatment layer 4 as in the first embodiment, includes first cathode electrolytic treatment (Step S107) and second cathode electrolytic treatment (Step S109). The first cathode electrolytic treatment and the second cathode electrolytic treatment are the same as in the first embodiment. Thus, descriptions will be omitted.

The second cathode electrolytic treatment is performed and then a washing treatment is performed (Step S III). The washing treatment in the embodiment is the same as in the first embodiment. Thus, descriptions will be omitted.

In addition, it is preferable that the chemical treatment liquid does not contain the organic substance such as a phenol resin. This point is the same as in the first embodiment.

EXAMPLES

Hereinafter, Examples and Comparative Examples of the present invention will be described. The examples shown below are merely illustrative examples of the steel sheet for containers and the method for producing a steel sheet for containers according to the embodiment of the present invention and the steel sheet for containers and the method for producing a steel sheet for containers according to the embodiment of the present invention are not limited to the following examples.

First Examples

<Coated Layer on Steel Sheet>

(A1 and A2: Method for Producing Coated Steel Sheet)

Using a method of the following treatment (A1) or (A2), a Sn coated layer was formed on a steel sheet having a thickness of 0.17 mm to 0.23 mm.

(A1) An original sheet which had been subjected to annealing and temper rolling after cold rolling was degreased and pickled and then Sn coated layer was formed using a ferrostan bath having a composition of 60 g/L of PSA (phenolsulfonic acid), 54 g/L of tin sulfate (30 g/L as Sn), 3 g/L of additives (ethoxylated-t-naphthol), and 3 g/L of additives (ethoxynaphtholsulfonic acid) under the conditions at a bath temperature of 50° C. and a current density of 7 A/dm$^2$ to 10 A/dm$^2$. The adhesion amount was adjusted with the electrolysis time.

(A2) An original sheet which had been subjected to annealing and temper rolling after cold rolling was degreased and pickled and then Sn coated layer was formed using a ferrostan bath having a composition of 60 g/L of PSA (phenolsulfonic acid), 54 g/L of tin sulfate (30 g/L as Sn), 3 g/L of additives (ethoxylated-α-naphthol), and 3 g/L of additives (ethoxynaphtholsulfonic acid) under the conditions at a bath temperature of 50° C. and a current density of 7 A/dm$^2$ to 10 A/dm$^2$. The adhesion amount was adjusted with the electrolysis time. Then, the Sn coated steel sheet was heated at 260° C. to fuse the Sn coated layer, and immediately water cooling (reflow treatment) was performed.

The Sn content in the obtained coated steel sheet was measured by an X-ray fluorescence method. The Sn content of each level is shown in Table 2.

TABLE 2

| | | Sn coating step | | Cathode electrolytic treatment step | | | | |
| | | | | First cathode electrolytic treatment | | Second cathode electrolytic treatment | | |
| Level | Treatment method | Sn coated content (mg/m$^2$) | Chemical treatment liquid | Temperature of chemical treatment liquid (° C.) | Number of times of energization (times) | Temperature of chemical treatment liquid (° C.) | Number of times of energization (times) | Remarks |
|---|---|---|---|---|---|---|---|---|
| C1 | A2 | 2,800 | B2 | 30 | 1 | 60 | 1 | Example |
| C2 | A2 | 2,800 | B2 | 25 | 6 | 50 | 2 | Example |
| C3 | A2 | 2,800 | B3 | 30 | 6 | 50 | 2 | Example |

TABLE 2-continued

| | | Sn coating step | | Cathode electrolytic treatment step | | | | |
|---|---|---|---|---|---|---|---|---|
| | | | | First cathode electrolytic treatment | | Second cathode electrolytic treatment | | |
| Level | Treatment method | Sn coated content (mg/m$^2$) | Chemical treatment liquid | Temperature of chemical treatment liquid (° C.) | Number of times of energization (times) | Temperature of chemical treatment liquid (° C.) | Number of times of energization (times) | Remarks |
| C4 | A2 | 2,800 | B3 | 30 | 8 | 60 | 2 | Example |
| C5 | A2 | 2,800 | B3 | 10 | 2 | 50 | 1 | Example |
| C6 | A2 | 560 | B2 | 20 | 1 | 50 | 1 | Example |
| C7 | A2 | 600 | B4 | 40 | 4 | 45 | 2 | Example |
| C8 | A2 | 2,800 | B3 | 40 | 4 | 45 | 2 | Example |
| C9 | A2 | 5,600 | B2 | 25 | 4 | 50 | 2 | Example |
| C10 | A2 | 2,800 | B3 | 30 | 8 | 60 | 2 | Example |
| C11 | A2 | 800 | B4 | 20 | 4 | 50 | 2 | Example |
| C12 | A1 | 2,800 | B1 | 10 | 4 | 45 | 2 | Example |
| C13 | A1 | 2,500 | B1 | 30 | 2 | 60 | 1 | Example |
| C14 | A2 | 6,000 | B3 | 30 | 8 | 60 | 2 | Reference Example |
| C15 | A2 | 3,000 | B4 | 60 | 1 | 60 | 1 | Comparative Example |
| C16 | A1 | 2,800 | B3 | 25 | 2 | 25 | 2 | Comparative Example |
| C17 | A2 | 500 | B3 | 45 | 2 | 60 | 1 | Comparative Example |
| C18 | A2 | 3,000 | B4 | 45 | 2 | 45 | 2 | Comparative Example |
| C19 | A2 | 2,800 | B3 | 50 | 2 | 50 | 2 | Comparative Example |
| C20 | A2 | 200 | B2 | 30 | 2 | 50 | 1 | Comparative Example |
| C21 | A2 | 1,000 | B1 | 30 | 2 | — | — | Comparative Example |
| C22 | A2 | 2,000 | B2 | — | — | 50 | 1 | Comparative Example |

<Formation of Chemical Treatment Layer>

The coated steel sheet prepared by the methods of the above (A1) or (A2) was subjected to a cathode electrolytic treatment under the conditions of the number of times of energization and the temperature shown in Table 2. Compositions of the chemical treatment liquid were shown in Table 3. The chemical treatment liquid is a treatment liquid that ammonium hexafluorozirconate (IV), hydrogen fluoride, ammonium nitrate, and phosphate were dissolved in distilled water and the pH thereof was adjusted to 3.5.

TABLE 3

| Kinds of ions (ppm) | B1 | B2 | B3 | B4 |
|---|---|---|---|---|
| Zr | 3,000 | 1,500 | 1,400 | 1,400 |
| PO$_4$ | — | — | 950 | 950 |
| T-F | 4,000 | 2,000 | 2,000 | 2,000 |
| NO$_3$ | — | 3,000 | 1,600 | 7,000 |
| NH$_4$ | — | 2,000 | 1,000 | 2,500 |

<Washing Treatment>

The chemical treatment layer was formed by the above treatment and then the steel sheet was immersed in distilled water at 20° C. to 40° C. for 0.5 seconds to 5 seconds. Then, the steel sheet was immersed in distilled water at 80° C. to 90° C. for 0.5 seconds to 3 seconds.

The Zr content and the P content of each level were adjusted by adjusting the current density (0.1 A/dm$^2$ to 30 A/dm$^2$) and the electrolysis time (for 0.5 seconds to 5 seconds).

<Performance Evaluation>

Regarding the test materials which had been subjected to the above treatments, performance evaluation on each of items (A) to (H) shown below was performed. The evaluation results are shown in Table 4.

(A) Surface Roughness

Arbitrary 20 portions (portions spaced by at least 10 cm or more) per 1 m$^2$ were cut out from the chemical treatment layer side of each test material and surface roughness thereof was measured under the conditions shown in Table 1 with a Pointprobe (registered trademark) NCH-10T (manufactured by Nano World AG.). The obtained data was used to obtain each surface roughness (Ra) using Image J (image processing software of the public domain in an open source developed by National Institutes of Health (NIH), USA) which is image processing software and thus the average roughness was obtained.

(B) Yellowness Index

Arbitrary 20 portions (portions spaced by at least 10 cm or more) per 1 m$^2$ were cut out from the chemical treatment layer side of each test material into a size of 50 mm×100 mm. The chemical treatment layer side to be evaluated was set to a front side and was subjected to a retort treatment at a temperature of 130° C. for 5 hours using a Z clave S-020A (manufactured by MIURA CO., LTD.). When the temperature in the device reached 60° C. or less, the test material was taken out and dried and then the yellowness index (YI value) was measured.

In the measurement of the YI value, the yellowness index (YI$_0$) before a retort treatment and the yellowness index (YI) after a retort treatment were respectively measured in a SCI (including regular reflection light) mode using a spectral colorimeter CM-2600d (manufactured by KONICA MINOLTA JAPAN, INC.). From these values, the absolute value of a ΔYI value, which is a difference between YI and $YI_0$, was obtained and the total value of these was divided by the number of measurement points to obtain the average.

(C) Sulfide Stain Resistance

The test material was cut out into a size of 55 mm×55 mm and an end portion (a portion in which the end face of the steel sheet was exposed by shearing) was masked with a tape at a length of 5 mm. The steel sheet was immersed in a 1 mass % $Na_2S$ aqueous solution (pH adjusted to 7 with lactic acid) and subjected to a retort treatment at 125° C. for 60 minutes. The external appearance of each steel sheet after the retort treatment was visually evaluated.

The evaluation was made in five stages of Excellent (no discoloration occurred), Good (slight discoloration occurred), Average (discoloration at the same degree as that of a chromate-treated material occurred), Fair (the degree of discoloration was slightly large compared to a chromate-treated material), and Poor (the degree of discoloration was large compared to a chromate-treated material).

The case in which an evaluation result of Average or higher was obtained was evaluated as Pass.

(D) Film Adhesion

A biaxially stretched PET film having a thickness of 20 μm was pasted on both surfaces of the test material at 170° C., and the laminate was subjected to can making by drawing and ironing stepwise. The defect, floating, and peeling of the film were observed and thus the film adhesion was evaluated from the area ratio thereof.

The evaluation was made in five stages of Excellent (the defect, floating, and peeling of the film were not observed at all), Good (the area ratio of the defect, floating, and peeling of the film was more than 0% and 0.5% or less), Average (the area ratio of the defect, floating, and peeling of the film was more than 0.5% and 3% or less), Fair (the area ratio of the defect, floating, and peeling of the film was more than 3% and 15% or less), and Poor (the area ratio of the defect, floating, and peeling of the film was more than 15% or the film was not able to be processed due to breakage).

The case in which an evaluation result of Average or higher was obtained was evaluated as Pass.

(E) Weldability

The test material was welded using a wire seam welding machine, under the condition of a welding wire speed of 80 m/min by varying the current. Based on the overall determination of the proper current range between the minimum current value at which a sufficient weld strength can be obtained, and the maximum current value at which a weld defect such as dust and weld sputter become noticeable, the weldability was evaluated.

The evaluation was made in four stages of Excellent (the proper current range at secondary side was 1,500 A or more), Good (the proper current range at secondary side was 800 A or more and less than 1,500 A), Fair (the proper current range at secondary side was 100 A or more and less than 800 A), and Poor (the proper current range at secondary side was less than 100 A).

The case in which the evaluation result was Good or higher was evaluated as Pass.

(F) Primary Lacquer Adhesion

An epoxy-phenol resin was applied to the test material and baked at a temperature of 200° C. for 30 minutes. The resultant coating was incised at intervals of 1 mm to provide a grid pattern so that the depth of the resultant incision reached the base metal and the incised test material was subjected to peeling test by using a tape. The state of peeling of the film was observed and the primary lacquer adhesion was evaluated from the peeling area ratio.

The evaluation was made in four stages of Excellent (the peeling area ratio was 0%), Good (the peeling area ratio was more than 0% and 5% or less), Fair (the peeling area ratio was more than 5% and 30% or less), and Poor (the peeling area ratio was more than 30%).

The case in which the evaluation result was Good or higher was evaluated as Pass.

(G) Secondary Lacquer Adhesion

An epoxy-phenol resin was applied to the test material and baked at a temperature of 200° C. for 30 minutes. The resultant coating was incised at intervals of 1 mm to provide a grid pattern so that the depth of the resultant incision reached the base metal and then the incised test material was subjected to a retort treatment at a temperature of 125° C. for 30 minutes. After drying, the lacquer was peeled off by using a tape, the state of peeling of the film was observed and the secondary lacquer adhesion was evaluated from the peeling area ratio.

The evaluation was made in four stages of Excellent (the peeling area ratio was 0%), Good (the peeling area ratio was more than 0% and 5% or less), Fair (the peeling area ratio was more than 5% and 30% or less), and Poor (the peeling area ratio was more than 30%).

The case in which the evaluation result was Good or higher was evaluated as Pass.

(H) Corrosion Resistance

An epoxy-phenol resin was applied to the test material and baked at a temperature of 200° C. for 30 minutes. Then, a cross-cut was formed into a depth reaching the base metal, and the resultant was immersed into a test liquid made of a liquid mixture of 1.5% citric acid and 1.5% common salt at a temperature of 45° C. for 72 hours. After washing and drying were performed, tape peeling was performed. The corrosion status under the lacquer of the cross-cut portion and the corrosion status of the flat sheet portion were observed, and the corrosion resistance was evaluated from evaluation of both the width of corrosion under the lacquer and the corrosion area ratio of the flat sheet portion.

The evaluation was made in four stages of Excellent (the corrosion width under the lacquer was less than 0.2 mm and the corrosion area ratio of the flat sheet portion was 0%), Good (the corrosion width under the lacquer was 0.2 mm to less than 0.3 mm and the corrosion area ratio of the flat sheet portion was more than 0% and 1% or less), Fair (the corrosion width under the lacquer was 0.3 mm to less than 0.45 mm and the corrosion area ratio of the flat sheet portion was more than 1% and 5% or less), and Poor (the corrosion width under the lacquer was more than 0.45 mm or the corrosion area ratio of the flat sheet portion was more than 5%).

The case in which the evaluation result was Good or higher was evaluated as Pass.

TABLE 4

| Level | Film component Zr (mg/m²) | Film component P (mg/m²) | Average roughness (nm) | Average of absolute value of ΔYI value | Sulfide stain resistance | Film adhesion | Weldability | Primary lacquer adhesion | Secondary lacquer adhesion | Corrosion resistance | Remark |
|---|---|---|---|---|---|---|---|---|---|---|---|
| C1 | 6.1 | — | 12.5 | 4.8 | Good | Good-Average | Excellent | Excellent-Good | Good | Good | Example |
| C2 | 28.9 | — | 94.3 | 0.4 | Good-Average | Good | Good | Excellent-Good | Good | Excellent-Good | Example |
| C3 | 29.4 | 19.3 | 78.6 | 0.3 | Excellent | Excellent-Good | Good | Excellent | Excellent-Good | Excellent | Example |
| C4 | 11.5 | 8.1 | 59.1 | 0.1 | Excellent | Excellent | Excellent | Excellent | Excellent-Good | Excellent | Example |
| C5 | 7.6 | 3.7 | 17.3 | 1.5 | Good | Good | Excellent | Excellent | Excellent-Good | Excellent-Good | Example |
| C6 | 6.2 | — | 12.6 | 4.6 | Good-Average | Good-Average | Excellent | Excellent-Good | Good | Good | Example |
| C7 | 12.4 | 8.8 | 46.9 | 3.6 | Good-Average | Excellent | Excellent | Excellent | Excellent-Good | Good | Example |
| C8 | 11.6 | 1.7 | 33.6 | 3.1 | Average | Excellent-Good | Excellent | Excellent-Good | Good | Good | Example |
| C9 | 11.4 | — | 20.3 | 0.4 | Good | Excellent-Good | Excellent | Excellent | Excellent-Good | Excellent | Example |
| C10 | 11.5 | 8.1 | 59.1 | 0.1 | Excellent | Excellent | Excellent | Excellent | Excellent-Good | Excellent | Example |
| C11 | 14.8 | 7.9 | 49.1 | 0.2 | Excellent | Excellent | Excellent | Excellent | Excellent-Good | Excellent | Example |
| C12 | 14.6 | — | 112.3 | 6.2 | Good | Good | Good | Good | Good | Good | Example |
| C13 | 11.3 | — | 132.4 | 7.1 | Good | Good | Good | Good | Good | Good | Example |
| C14 | 13.9 | 6.6 | 58.1 | 0.4 | Excellent | Excellent | Excellent | Excellent | Excellent-Good | Excellent | Reference Example |
| C15 | 35.1 | 16.1 | 126.3 | 8.7 | Poor | Fair-Poor | Fair-Poor | Fair | Fair | Fair-Poor | Comparative Example |
| C16 | 12.1 | 6.2 | 9.6 | 0.2 | Excellent | Fair-Poor | Excellent | Excellent | Excellent-Good | Excellent | Comparative Example |
| C17 | 5.9 | 1.7 | 44.5 | 6.2 | Fair-Poor | Average-Fair | Fair-Poor | Fair | Fair-Poor | Poor | Comparative Example |
| C18 | 41.9 | 22.2 | 98.4 | 5.4 | Fair-Poor | Poor | Poor | Fair | Fair | Fair-Poor | Comparative Example |
| C19 | 12.4 | 5.8 | 108.6 | 14.5 | Poor | Good-Average | Good-Fair | Fair | Fair | Fair-Poor | Comparative Example |
| C20 | 18.2 | — | 102.5 | 8.8 | Average | Average-Fair | Poor | Good | Good | Poor | Comparative Example |
| C21 | 12.5 | — | 109.3 | 5.3 | Fair-Poor | Fair | Good | Fair | Poor | Good | Comparative Example |
| C22 | 21.3 | — | 111.2 | 6.7 | Poor | Average | Fair | Good | Poor | Fair | Comparative Example |

All Levels C1 to C13 belonging to the range of the present invention had a surface roughness (Ra) of 10 nm to 100 nm and an average of the absolute values of ΔYI values of 5.0 or less. Levels C1 to C13 had excellent sulfide stain resistance, weldability, primary lacquer adhesion, secondary lacquer adhesion, and corrosion resistance under lacquer.

On the other hand, it was found that in Levels C15 to C22 not satisfying either requirement of the surface roughness (Ra) or the ΔYI value of the present invention, at least one of properties of film adhesion (including workability), sulfide stain resistance, weldability, primary lacquer adhesion, secondary lacquer adhesion, or corrosion resistance was deteriorated.

It was found that Level C14 was a case in which the amount of Ni and the amount of Sn are increased than the defined amount, but the performance of the chemical treatment layer was saturated.

Second Examples

<Coated Layer on Steel Sheet>
(A3 to A5: Method for Producing Coated Steel Sheet)
Using a method of the following treatment (A3) to (A5), a Ni coated layer and a Sn coated layer were formed on a steel sheet having a thickness of 0.17 mm to 0.23 mm.

(A3) An original sheet which had been subjected to annealing and temper rolling after cold rolling was degreased and pickled and then a Fe—Ni alloy coated layer was formed using a sulfuric acid-hydrochloric acid bath having a composition of 75 g/L of nickel sulfate hexahydrate, 140 g/L of nickel chloride hexahydrate, 110 g/L of ferrous sulfate heptahydrate, 30 g/L of boric acid, and 3 g/L of citric acid under the conditions at a bath temperature of 50° C. and a current density of 5 A/dm². Next, Sn coated layer was formed using a ferrostan bath having a composition of 60 g/L of PSA (phenolsulfonic acid), 54 g/L of tin sulfate (30 g/L as Sn), 3 g/L of additives (ethoxylated-α-naphthol), and 3 g/L of additives (ethoxynaphtholsulfonic acid) under the conditions at a bath temperature of 50° C. and a current density of 7 A/dm². The adhesion amount was adjusted with the electrolysis time. Then, the Sn coated steel sheet was heated at 260° C. to fuse the Sn coated layer, and immediately water cooling (reflow treatment) was performed.

(A4) An original sheet which had been subjected to annealing and temper rolling after cold rolling and a Ni coated layer was formed using a Watt bath having a composition of 75 g/L of nickel sulfate hexahydrate, 140 g/L of nickel chloride hexahydrate, and 40 g/L of boric acid, with a pH of 4 under the conditions at a bath temperature of 50° C. and a current density of 5 A/dm. A Ni diffused layer was formed during annealing, the resultant was the degreased and pickled, and then Sn coated layer was formed using a ferrostan bath having a composition of 60 g/L of PSA (phenolsulfonic acid), 54 g/L of tin sulfate (30 g/L as Sn), 3 g/L of additives (ethoxylated-α-naphthol), and 3 g/L of additives (ethoxynaphtholsulfonic acid) under the conditions at a bath temperature of 50° C. and a current density of 7 A/dm². Then, the Sn coated steel sheet was heated at 260° C. to fuse the Sn coated layer, and immediately water cooling (reflow treatment) was performed.

(A5) An original sheet which had been subjected to annealing and temper rolling after cold rolling was degreased and pickled and then a Fe—Ni alloy coated layer was formed using a sulfuric acid-hydrochloric acid bath having a composition of 75 g/L of nickel sulfate hexahydrate, 140 g/L of nickel chloride hexahydrate, 110 g/L of ferrous sulfate heptahydrate, 30 g/L of boric acid, and 3 g/L of citric acid under the conditions at a bath temperature of 50° C. and a current density of 5 A/dm². Next, Sn coated layer was formed using a ferrostan bath having a composition of 60 g/L of PSA (phenolsulfonic acid), 54 g/L of tin sulfate (30 g/L as Sn), 3 g/L of additives (ethoxylated-t-naphthol), and 3 g/L of additives (ethoxynaphtholsulfonic acid) under the conditions at a bath temperature of 50° C. and a current density of 7 A/dm².

The Ni content and the Sn content in the formed Ni coated layer and Sn coated layer were measured by an X-ray fluorescence method. The Ni content and the Sn content of each level are shown in Table 5.

TABLE 5

| | Ni coating step and Sn coating step | | | Cathode electrolytic treatment step | | | | |
|---|---|---|---|---|---|---|---|---|
| | | | | First cathode electrolytic treatment | | Second cathode electrolytic treatment | | |
| Level | Treatment Method | Ni coated content (mg/m²) | Sn coated content (mg/m²) | Chemical treatment liquid | Temperature of chemical treatment liquid (° C.) | Number of times of energization (times) | Temperature of chemical treatment liquid (° C.) | Number of times of energization (times) | Remarks |
| D1 | A3 | 40 | 1,000 | B1 | 10 | 2 | 45 | 2 | Example |
| D2 | A3 | 70 | 1,500 | B2 | 25 | 1 | 60 | 1 | Example |
| D3 | A4 | 150 | 1,000 | B2 | 25 | 4 | 55 | 2 | Example |
| D4 | A3 | 40 | 2,500 | B2 | 30 | 2 | 50 | 2 | Example |
| D5 | A3 | 50 | 340 | B3 | 10 | 2 | 55 | 1 | Example |
| D6 | A3 | 50 | 3,000 | B3 | 40 | 4 | 45 | 3 | Example |
| D7 | A3 | 50 | 3,000 | B3 | 40 | 4 | 45 | 3 | Example |
| D8 | A3 | 40 | 1,000 | B3 | 30 | 6 | 50 | 2 | Example |
| D9 | A3 | 40 | 2,000 | B3 | 30 | 8 | 60 | 2 | Example |
| D10 | A3 | 8 | 1,000 | B2 | 20 | 1 | 50 | 1 | Example |
| D11 | A4 | 40 | 1,500 | B4 | 20 | 4 | 55 | 2 | Example |
| D12 | A4 | 100 | 800 | B4 | 40 | 4 | 45 | 3 | Example |
| D13 | A3 | 40 | 1,000 | B1 | 35 | 2 | 60 | 2 | Example |
| D14 | A3 | 3 | 1,000 | B2 | 25 | 2 | 50 | 2 | Example |
| D15 | A3 | 180 | 1,000 | B3 | 30 | 4 | 55 | 2 | Example |
| D16 | A4 | 50 | 3,200 | B3 | 30 | 4 | 55 | 2 | Example |
| D17 | A5 | 100 | 1,000 | B4 | 25 | 1 | 55 | 1 | Example |
| D18 | A3 | 40 | 250 | B3 | 30 | 2 | 60 | 2 | Comparative Example |
| D19 | A3 | 40 | 1,000 | B3 | 25 | 2 | 25 | 2 | Comparative Example |
| D20 | A3 | 40 | 1,000 | B3 | 55 | 2 | 55 | 2 | Comparative Example |
| D21 | A4 | 50 | 1,000 | B1 | 45 | 1 | 60 | 1 | Comparative Example |
| D22 | A3 | 50 | 1,200 | B1 | 60 | 1 | — | — | Comparative Example |
| D23 | A3 | 50 | 1,000 | B4 | 45 | 1 | 45 | 1 | Comparative Example |
| D24 | A3 | 50 | 2,000 | B1 | 30 | 2 | — | — | Comparative Example |
| D25 | A3 | 70 | 1,200 | B2 | — | — | 55 | 1 | Comparative Example |

<Formation of Chemical Treatment Layer>

The coated steel sheet prepared by the methods of the above (A3) to (A5) was immersed in a chemical treatment liquid shown in Table 3, and was subjected to a cathode electrolytic treatment under the conditions of the number of times of energization and the temperature shown in Table 5.

<Washing Treatment>

After the chemical treatment layer was formed, the washing treatment was performed in the same manner as in the first embodiment.

<Performance Evaluation>

Regarding the test materials which had been subjected to the above treatments, performance evaluation on each of measurements of surface roughness and yellowness index, sulfide stain resistance, film adhesion, weldability, primary lacquer adhesion, secondary lacquer adhesion, and corrosion resistance was performed, in the same manner as in the first embodiment. The evaluation results are shown in Table 6.

that further excellent sulfide stain resistance, film adhesion, and corrosion resistance could been exhibited.

On the other hand, it was found that in Levels D18 to D25 not satisfying at least one of requirements of the average roughness (Ra) and the ΔYI value of the present invention, at least one of properties of sulfide stain resistance, film adhesion, weldability, primary lacquer adhesion, secondary lacquer adhesion, and corrosion resistance was deteriorated.

While the suitable embodiments of the present invention have been described above in detail, the present invention is not limited to such examples. It is understood by those skilled in the art to which the present invention belongs that

TABLE 6

| | Film component | | Film properties | | Evaluation result | | | | | | |
|---|---|---|---|---|---|---|---|---|---|---|---|
| | | | Average roughness (nm) | Average of absolute value of ΔYI value | Sulfide stain resistance | Film adhesion | Weldability | Primary lacquer adhesion | Secondary lacquer adhesion | Corrosion resistance | Remark |
| Level | Zr (mg/m$^2$) | P (mg/m$^2$) | | | | | | | | | |
| D1 | 14.6 | — | 18.3 | 0.6 | Good | Good | Excellent | Excellent-Good | Good | Excellent-Good | Example |
| D2 | 6.4 | — | 10.8 | 4.9 | Average | Good-Average | Excellent | Excellent-Good | Good | Good | Example |
| D3 | 11.2 | — | 24.7 | 0.2 | Good | Good | Excellent | Excellent-Good | Good | Good | Example |
| D4 | 19.4 | — | 98.2 | 0.4 | Good | Excellent | Good | Excellent-Good | Good | Excellent-Good | Example |
| D5 | 8.2 | 4.8 | 18.3 | 1.2 | Excellent-Good | Excellent-Good | Excellent | Excellent | Excellent | Excellent | Example |
| D6 | 6.0 | 2.2 | 34.3 | 2.8 | Good | Excellent | Excellent | Excellent | Excellent-Good | Excellent-Good | Example |
| D7 | 5.3 | 1.8 | 30.2 | 3.3 | Good-Average | Excellent-Good | Excellent | Excellent-Good | Good | Good | Example |
| D8 | 29.2 | 19.6 | 79.1 | 0.2 | Excellent | Excellent | Good | Excellent | Excellent | Excellent | Example |
| D9 | 13.6 | 6.1 | 43.2 | 0.1 | Excellent | Excellent | Excellent | Excellent | Excellent | Excellent | Example |
| D10 | 6.3 | — | 15.1 | 4.2 | Good-Average | Average-Fair | Excellent | Excellent-Good | Good | Good | Example |
| D11 | 14.6 | 9.1 | 44.9 | 0.3 | Excellent | Excellent | Excellent | Excellent | Excellent | Excellent | Example |
| D12 | 11.6 | 8.2 | 50.4 | 3.2 | Good | Excellent | Excellent | Excellent | Excellent | Good | Example |
| D13 | 10.2 | — | 26.1 | 1.7 | Good | Excellent-Good | Excellent | Excellent | Excellent | Excellent-Good | Example |
| D14 | 13.7 | — | 29.6 | 4.1 | Average | Average | Good | Good | Good | Good | Example |
| D15 | 12.6 | 5.8 | 28.6 | 0.4 | Excellent | Excellent | Excellent | Excellent | Excellent | Excellent | Example |
| D16 | 13.2 | 6.6 | 30.3 | 0.3 | Excellent | Excellent | Excellent | Excellent | Excellent | Excellent | Example |
| D17 | 34.2 | 23.2 | 123.1 | 7.3 | Good | Average | Good | Good | Good | Good | Example |
| D18 | 12.5 | 5.6 | 89.2 | 1.1 | Good | Average | Good | Fair-Poor | Poor | Fair-Poor | Comparative Example |
| D19 | 9.8 | 4.9 | 8.4 | 0.3 | Excellent | Poor | Excellent | Excellent | Excellent | Excellent | Comparative Example |
| D20 | 10.2 | 5.1 | 112.7 | 15.1 | Poor | Good-Average | Excellent | Good-Fair | Fair | Fair-Poor | Comparative Example |
| D21 | 4.3 | 2.3 | 43.8 | 9.0 | Poor | Average-Fair | Excellent | Good-Fair | Fair | Poor | Comparative Example |
| D22 | 38.2 | 14.8 | 110.2 | 6.7 | Fair-Poor | Good | Fair-Poor | Fair | Good-Fair | Fair | Comparative Example |
| D23 | 42.6 | 22.8 | 98.2 | 6.1 | Fair-Poor | Excellent-Good | Poor | Good-Fair | Fair | Fair | Comparative Example |
| D24 | 12.5 | — | 121.3 | 7.2 | Poor | Fair-Poor | Fair | Good | Good | Poor | Comparative Example |
| D25 | 14.6 | — | 115.8 | 8.3 | Poor | Good | Good | Fair | Fair | Fair | Comparative Example |

All Levels D1 to D17 belonging to the range of the present invention had a average roughness (Ra) of 10 nm to 100 nm and an average of the absolute values of ΔYI values of 5.0 or less. Levels D1 to D17 had excellent sulfide stain resistance, film adhesion, weldability, primary lacquer adhesion, secondary lacquer adhesion, and corrosion resistance.

In addition, the chemical treatment layer contained 2 mg/m$^2$ or more of phosphate in terms of the amount of P, so it is apparent that various alterations and modifications can be made within the category of the technical concept described in the appended claims and thus the examples naturally belong to the technical scope of the present invention.

INDUSTRIAL APPLICABILITY

According to the present invention, it is possible to provide a steel sheet for containers having excellent film adhesion, sulfide stain resistance, weldability, corrosion resistance, and lacquer adhesion, and a method for producing a steel sheet for containers. Accordingly, the present invention has sufficient industrial applicability.

BRIEF DESCRIPTION OF THE REFERENCE SYMBOLS 1, 11 steel sheet for containers
2, 12 steel sheet
3, 13 Sn coated layer
4, 14 chemical treatment layer
15 Ni coated layer

The invention claimed is:

1. A steel sheet for containers comprising:
a steel sheet;
a Sn coated layer that is formed on at least one surface of the steel sheet; and
a chemical treatment layer that is formed on the Sn coated layer,
wherein the Sn coated layer contains 300 mg/m$^2$ to 5,600 mg/m$^2$ of Sn in terms of an amount of metal Sn,
the chemical treatment layer contains 5 mg/m$^2$ to 30 mg/m$^2$ of a Zr hydrated oxide compound in terms of an amount of metal Zr,
the chemical treatment layer is formed by performing a cathode electrolytic treatment in a chemical treatment liquid that contains a Zr ion and a F ion,
an average roughness Ra of an outermost surface of the chemical treatment layer obtained with a scanning probe microscope is 10 nm to 100 nm,
a variation amount in a yellowness index measured at one measurement point on the outermost surface of the chemical treatment layer is defined as $\Delta YI$ represented by Equation (1), and
an average of absolute values of the $\Delta YI$ obtained at the arbitrary 20 measurement points per 1 m$^2$ of the outermost surface is 5.0 or less, $$\Delta YI = YI - YI_0 \quad (1)$$

where
YI: yellowness index measured after the steel sheet for containers is subjected to a retort treatment at a temperature of 130° C. for 5 hours,
YI$_0$: yellowness index measured before the retort treatment.

2. A steel sheet for containers comprising:
a steel sheet;
a Sn coated layer that is formed on at least one surface of the steel sheet; and
a chemical treatment layer that is formed on the Sn coated layer,
wherein the Sn coated layer contains 300 mg/m$^2$ to 5,600 mg/m$^2$ of Sn in terms of an amount of metal Sn,
the chemical treatment layer contains 5 mg/m$^2$ to 30 mg/m$^2$ of a Zr compound in terms of an amount of metal Zr,
the chemical treatment layer is formed by performing a cathode electrolytic treatment in a chemical treatment liquid that contains a Zr ion and a F ion,
an average roughness Ra of an outermost surface of the chemical treatment layer obtained with a scanning probe microscope is 10 nm to 100 nm,
a variation amount in a yellowness index measured at one measurement point on the outermost surface of the chemical treatment layer is defined as $\Delta YI$ represented by Equation (1), and
an average of absolute values of the $\Delta YI$ obtained at the arbitrary 20 measurement points per 1 m$^2$ of the outermost surface is 5.0 or less, $$\Delta YI = YI - YI_0 \quad (1)$$

where
YI: the yellowness index measured after the steel sheet for containers is subjected to a retort treatment at a temperature of 130° C. for 5 hours,
YI$_0$: the yellowness index measured before the retort treatment.

3. The steel sheet for containers according to claim 2, wherein a Ni coated layer containing Ni is formed under the Sn coated layer.

4. The steel sheet for containers according to claim 3, wherein the Sn coated layer contains 300 mg/m$^2$ to 3,000 mg/m$^2$ of Sn in terms of an amount of metal Sn.

5. The steel sheet for containers according to claim 4, wherein the Ni coated layer contains 5 mg/m$^2$ to 150 mg/m$^2$ of Ni in terms of an amount of metal Ni.

6. The steel sheet for containers according to claim 3, wherein the Sn coated layer contains a Sn alloy and the Ni coated layer contains a Ni alloy.

7. The steel sheet for containers according to claim 2, wherein the Sn coated layer contains a Sn alloy.

8. The steel sheet for containers according to claim 2, wherein the chemical treatment layer contains 2 mg/m$^2$ to 20 mg/m$^2$ of a phosphate compound in terms of an amount of P.

9. The steel sheet for containers according to claim 8, wherein the chemical treatment layer is formed by performing a cathode electrolytic treatment in a chemical treatment liquid that contains a Zr ion, a F ion, and a phosphate ion.

10. A method for producing the steel sheet for containers according to claim 2, comprising:
a coating step of forming a Sn coated layer that contains a Sn on a surface of the steel sheet;
a cathode electrolytic treatment step of forming a chemical treatment layer on a surface of the Sn coated layer using a chemical treatment liquid that contains at least a Zr ion and a F ion, by performing a first cathode electrolytic treatment in which the temperature of the chemical treatment liquid is 10° C. to 40° C., and a second cathode electrolytic treatment in which the temperature of the chemical treatment liquid is 45° C. to 60° C.; and
a washing treatment step of performing a washing treatment using washing water at at least 40° C. or higher for 0.5 seconds or longer.

11. The method for producing a steel sheet for containers according to claim 10,
wherein, in the coating step, a Ni coated layer is formed on the surface of the steel sheet, and then the Sn coated layer is formed on a surface of the Ni coated layer.

12. The method for producing a steel sheet for containers according to claim 11, the method comprising:
a reflow treatment step of alloying at least a part of a Sn which is contained in the Sn coated layer after the coating step.

13. The method for producing a steel sheet for containers according to claim 12,
wherein the chemical treatment liquid contains at least one kind of a phosphate ion, a nitrate ion, and an ammonium ion.

14. The method for producing a steel sheet for containers according to claim 11, wherein the chemical treatment liquid contains at least one kind of a phosphate ion, a nitrate ion, and an ammonium ion.

15. The method for producing a steel sheet for containers according to claim 10, the method comprising:
   a reflow treatment step of alloying at least a part of a Sn which is contained in the Sn coated layer after the coating step.

16. The method for producing a steel sheet for containers according to claim 15,
   wherein the chemical treatment liquid contains at least one kind of a phosphate ion, a nitrate ion, and an ammonium ion.

17. The method for producing a steel sheet for containers according to claim 10,
   wherein the chemical treatment liquid contains at least one kind of a phosphate ion, a nitrate ion, and an ammonium ion.

* * * * *